(12) United States Patent
Imai et al.

(10) Patent No.: US 10,953,842 B2
(45) Date of Patent: Mar. 23, 2021

(54) GAS GENERATOR

(71) Applicant: NIPPON KAYAKU KABUSHIKI KAISHA, Chiyoda-ku (JP)

(72) Inventors: Takahiro Imai, Himeji (JP); Genya Iizuka, Himeji (JP); Akinori Matsumoto, Himeji (JP); Masaki Hiraoka, Himeji (JP); Syouichi Ashida, Himeji (JP)

(73) Assignee: NIPPON KAYAKU KABUSHIKI KAISHA, Chiyoda-ku (JP)

( * ) Notice: Subject to any disclaimer, the term of this patent is extended or adjusted under 35 U.S.C. 154(b) by 101 days.

(21) Appl. No.: 16/093,760

(22) PCT Filed: Apr. 18, 2017

(86) PCT No.: PCT/JP2017/015541
§ 371 (c)(1),
(2) Date: Oct. 15, 2018

(87) PCT Pub. No.: WO2017/183626
PCT Pub. Date: Oct. 26, 2017

(65) Prior Publication Data
US 2019/0077360 A1 Mar. 14, 2019

(30) Foreign Application Priority Data

Apr. 18, 2016 (JP) .............................. JP2016-082660
Oct. 28, 2016 (JP) .............................. JP2016-211926

(51) Int. Cl.
*B60R 21/264* (2006.01)
*B01J 7/00* (2006.01)
*B60R 21/26* (2011.01)

(52) U.S. Cl.
CPC ............. *B60R 21/2646* (2013.01); *B01J 7/00* (2013.01); *B60R 21/264* (2013.01); *B60R 2021/26011* (2013.01); *B60R 2021/2648* (2013.01)

(58) Field of Classification Search
CPC ............. B60R 21/2646; B60R 21/264; B60R 2021/26011; B60R 2021/2648; B01J 7/00
See application file for complete search history.

(56) References Cited

U.S. PATENT DOCUMENTS 5,725,834 A 3/1998 Nishii et al.
5,951,042 A * 9/1999 O'Loughlin ........ B60R 21/2644
102/531
(Continued)

FOREIGN PATENT DOCUMENTS

CN 101346263 A 1/2009
JP 8-133001 A 5/1996
(Continued)

OTHER PUBLICATIONS

International Search Report dated May 30, 2017, in PCT/JP2017/015541, filed Apr. 18, 2017.
(Continued)

*Primary Examiner* — Darlene P Condra
(74) *Attorney, Agent, or Firm* — Oblon, McClelland, Maier & Neustadt, L.L.P.

(57) ABSTRACT

A gas generator includes an elongated cylindrical housing, an accommodation chamber defining member arranged in the housing, a gas generating agent, and an autoignition agent. The accommodation chamber defining member includes a cylindrical portion which extends in a direction in parallel to an axial direction of the housing and accommodates the gas generating agent therein. A heat insulating layer is located between the housing and the cylindrical portion. The autoignition agent is arranged in a portion (Continued)

inside the housing in the axial direction of the housing where no heat insulating layer is provided, as being in contact with the housing with a member made of a metal being interposed.

15 Claims, 15 Drawing Sheets

(56) References Cited

U.S. PATENT DOCUMENTS

| | | | |
|---|---|---|---|
| 6,474,684 B1* | 11/2002 | Ludwig | B60R 21/2644 280/736 |
| 6,851,373 B2 | 2/2005 | Quioc | |
| 8,573,644 B1 | 11/2013 | Mayville et al. | |
| 2005/0011393 A1* | 1/2005 | Kelly | B60R 21/2644 102/430 |
| 2005/0134031 A1* | 6/2005 | McCormick | B60R 21/264 280/741 |
| 2010/0123303 A1* | 5/2010 | Boucher | B60R 21/26 280/743.1 |
| 2012/0125219 A1 | 5/2012 | Mayville et al. | |
| 2015/0197213 A1 | 7/2015 | Clark | |
| 2015/0217717 A1 | 8/2015 | Ohsugi et al. | |
| 2017/0210333 A1 | 7/2017 | Imai et al. | |
| 2018/0154859 A1* | 6/2018 | Kubo | B60R 21/264 |

FOREIGN PATENT DOCUMENTS

| | | |
|---|---|---|
| JP | 9-12302 A | 1/1997 |
| JP | 3137916 U | 11/2007 |
| JP | 2014-46704 A | 3/2014 |
| JP | 2016-022829 A | 2/2016 |
| JP | 2016-22930 A | 2/2016 |
| WO | WO 2015/105561 A1 | 7/2015 |
| WO | WO 2016/031656 A1 | 3/2016 |

OTHER PUBLICATIONS

Chinese Office Action dated Jul. 17, 2020, in Chinese Patent Application No. 201780024194.0 with English translation (12 pages).

* cited by examiner

GAS GENERATOR

TECHNICAL FIELD

The present invention relates to a gas generator incorporated in an air bag apparatus as a passenger protection apparatus equipped in a car and the like, and particularly to what is called a cylinder type gas generator having an elongated columnar outer geometry.

BACKGROUND ART

From a point of view of protection of a driver and/or a passenger in a car, an air bag apparatus which is a passenger protection apparatus has conventionally widely been used. The air bag apparatus is equipped for the purpose of protecting a driver and/or a passenger against shock caused at the time of collision of a vehicle, and it receives a body of a driver or a passenger with the air bag serving as a cushion by instantaneously expanding and developing the air bag at the time of collision of a vehicle.

The gas generator is equipment which is incorporated in this air bag apparatus, an igniter therein being ignited in response to power feed through a control unit at the time of collision of a vehicle to thereby burn a gas generating agent with flame caused by the igniter and instantaneously generate a large amount of gas, and thus expands and develops an air bag.

Depending on a position of installation in a vehicle and the like or on specifications such as output, gas generators of various constructions are available. A gas generator called a cylinder type gas generator represents one example. The cylinder type gas generator has an outer geometry in an elongated columnar shape and it is suitably incorporated in a side air bag apparatus, a curtain air bag apparatus, a knee air bag apparatus, or a seat cushion air bag apparatus.

Normally, in a cylinder type gas generator, an igniter is installed at one end portion in an axial direction of a housing, a combustion chamber accommodating a gas generating agent is provided on a side of the one end portion, a filter chamber accommodating a filter is provided on a side of the other end portion in the axial direction of the housing, and a gas discharge opening is provided in a circumferential wall portion of the housing in a portion defining the filter chamber.

In the cylinder type gas generator thus constructed, gas generated in the combustion chamber flows into the filter chamber along the axial direction of the housing and passes through the filter, and the gas which has passed through the filter is discharged to the outside through the gas discharge opening.

In case of fire in a vehicle equipped with an air bag apparatus incorporating a cylinder type gas generator, the cylinder type gas generator is externally heated and a temperature in the cylinder type gas generator may increase up to approximately several hundred degrees. When the temperature of the gas generating agent reaches its spontaneous combustion temperature in that case, an abnormal operation is induced.

When such an abnormal operation is induced, a pressure in the housing may increase to a pressure much higher than a designed pressure required at the time of activation of a common cylinder type gas generator due to burning of the gas generating agent because the cylinder type gas generator itself has already been in a high-temperature state due to external heating. In that case, a pressure exceeding a withstanding pressure of the housing may be applied to the housing, and consequently the housing may rupture.

Therefore, in a common cylinder type gas generator, an agent called an autoignition agent lower in spontaneous combustion temperature than a gas generating agent is loaded in the housing. Then, even when the cylinder type gas generator is externally heated, the autoignition agent ignites while a temperature is relatively low so that the gas generating agent burns and what is called an autoignition operation is exhibited. A pressure in the housing is adjusted not to reach a breaking pressure.

The autoignition agent described above is often placed, for example, in a combustion chamber where a gas generating agent is arranged, and a cylinder type gas generator constructed as such is disclosed, for example, in U.S. Pat. No. 6,851,373 (PTL 1).

In a gas generator such as a cylinder type gas generator, it is important that a gas generating agent is hermetically sealed from the outside, because desired gas output may not be obtained when the gas generating agent absorbs moisture.

A method of accommodating a gas generating agent in a gastight container formed from a relatively weak member which melts or bursts with heat or a pressure generated by activation of an igniter and arranging the gastight container in the housing is available as a method of preventing the gas generating agent from absorbing moisture in a cylinder type gas generator. A cylinder type gas generator in accordance with this method is disclosed, for example, in FIGS. 1 to 11 of Japanese Patent Laying-Open No. 2016-22930 (PTL 2).

In the gas generator disclosed in Japanese Patent Laying-Open No. 2016-22930, the gastight container is constituted of a cylindrical container body with bottom which has an opening end and a lid body which closes the opening end of the container body. Various methods such as brazing, adhesion, welding, and tightening by winding are available for joint between the container body and the lid body.

CITATION LIST

Patent Literature

PTL 1: U.S. Pat. No. 6,851,373
PTL 2: Japanese Patent Laying-Open No. 2016-22930

SUMMARY OF INVENTION

Technical Problem

From a point of view of improved safety of a cylinder type gas generator, in order to reliably exhibit an autoignition operation in case of an abnormal condition such as the fire described above, the cylinder type gas generator is preferably constructed such that external heat is less likely to conduct to the gas generating agent but is more likely to conduct to the autoignition agent.

According to such a construction, in case of fire in a vehicle, timing of exhibition of the autoignition operation described above can be earlier, and consequently a temperature of the gas generating agent at the time when the autoignition operation is exhibited can be suppressed. Therefore, increase in internal pressure in the housing at the time of the autoignition operation can significantly be suppressed.

Therefore, not only break of the housing can more reliably be prevented but also a withstanding pressure required of the housing can further be suppressed. Consequently, the housing can be smaller in thickness, which also contributes to reduction in size and weight of the cylinder type gas generator.

Since how the autoignition agent is specifically held in the housing affects also output characteristics of the cylinder type gas generator during a normal operation, this aspect should also closely be studied.

Therefore, the present invention was made in view of the aspects described above, and an object thereof is to provide a gas generator reduced in size and weight and improved in safety as compared with a conventional example.

Solution to Problem

A gas generator based on a first aspect of the present invention includes a housing, a gas generating agent, an igniter, an accommodation chamber defining member, and an autoignition agent. The housing is formed from an elongated cylindrical member having axial one and the other end portions closed and having a circumferential wall portion. The gas generating agent is arranged in the housing. The igniter is assembled to the one end portion of the housing, and serves to burn the gas generating agent. The accommodation chamber defining member is arranged in the housing, defines a gas generating agent accommodation chamber where the gas generating agent is accommodated, and melts or bursts with heat or a pressure generated by activation of the igniter. The autoignition agent serves to burn the gas generating agent by self-igniting without depending on activation of the igniter. The accommodation chamber defining member includes at least a cylindrical portion which extends in a direction in parallel to an axial direction of the circumferential wall portion and accommodates the gas generating agent. A heat insulating layer is provided in at least a part between the circumferential wall portion and the cylindrical portion. The autoignition agent is arranged in a portion inside the housing in the axial direction of the circumferential wall portion where no heat insulating layer is provided, as being in contact with the circumferential wall portion with a member made of a metal being interposed.

The gas generator based on the first aspect of the present invention may further include a partition portion which partitions a space in the housing in the axial direction of the circumferential wall portion such that a combustion chamber where the accommodation chamber defining member is arranged is formed at a position on a side of the one end portion of the housing and a filter chamber where a filter is arranged is formed at a position on a side of the other end portion of the housing. In that case, the partition portion preferably includes a cylindrical separation wall member with bottom, the separation wall member being inserted in the circumferential wall portion and formed from a member made of a metal. In that case, the heat insulating layer is preferably provided between the circumferential wall portion and the cylindrical portion by inserting an axial end portion of the cylindrical portion on a side of the filter chamber into the separation wall member. In that case, the autoignition agent is preferably arranged as being in contact with the circumferential wall portion with at least the separation wall member formed from the member made of the metal being interposed.

In the gas generator based on the first aspect of the present invention, the accommodation chamber defining member may include a cylindrical container body with bottom including the cylindrical portion and a bottom portion which closes the axial end portion of the cylindrical portion on the side of the filter chamber. In that case, the container body may be formed from a member made of a metal.

In the gas generator based on the first aspect of the present invention, preferably, the separation wall member is arranged as abutting on the bottom portion and the autoignition agent is arranged in the container body as abutting on the bottom portion, so that the autoignition agent is arranged as being in contact with the circumferential wall portion with the bottom portion of the container body formed from the member made of the metal and the separation wall member formed from the member made of the metal being interposed.

The gas generator based on the first aspect of the present invention may further include a division member formed from a member made of a metal and inserted in the cylindrical portion, the division member dividing a space in the container body into the gas generating agent accommodation chamber and a space where the autoignition agent is arranged. In that case, preferably, the autoignition agent is arranged as abutting on the division member so that the autoignition agent is arranged as being in contact with the circumferential wall portion with the division member formed from the member made of the metal and the cylindrical portion of the container body formed from the member made of the metal being interposed.

In the gas generator based on the first aspect of the present invention, the autoignition agent may be arranged outside the container body as abutting on the separation wall member and the bottom portion, so that the autoignition agent is arranged as being in contact with the circumferential wall portion with the bottom portion and the cylindrical portion of the container body formed from the member made of the metal and the separation wall member formed from the member made of the metal being interposed.

In the gas generator based on the first aspect of the present invention, the accommodation chamber defining member may further include a lid body formed from a member made of a metal in addition to the container body. In that case, preferably, the lid body includes a lid portion which closes an axial end portion of the cylindrical portion on a side of the igniter. In that case, preferably, the gas generating agent accommodation chamber is hermetically sealed by the cylindrical portion, the bottom portion, and the lid portion.

In the gas generator based on the first aspect of the present invention, preferably, the lid portion is made of a part in a form of a flat plate which faces the igniter and is located in the container body as the lid portion is inserted into an opening end of the container body. In that case, preferably, the lid body further includes a fold-over portion extending from a circumferential edge of the lid portion, at least a part of the fold-over portion being curved so as to cover an inner circumferential surface, an end surface, and an outer circumferential surface of the opening end of the container body. In that case, preferably, a portion forming the fold-over portion is greater in thickness than a portion forming the cylindrical portion.

In the gas generator based on the first aspect of the present invention, preferably, the accommodation chamber defining member is biased toward the partition portion by arranging an elastic body as abutting on the fold-over portion and the one end portion of the housing.

In the gas generator based on the first aspect of the present invention, the elastic body is preferably a coil spring.

In the gas generator based on the first aspect of the present invention, the heat insulating layer may be provided between the circumferential wall portion and the cylindrical portion by loosely fitting an end portion of the accommodation chamber defining member on the side of the igniter into the housing.

In the gas generator based on the first aspect of the present invention, the accommodation chamber defining member may include an increased diameter portion which extends from the cylindrical portion in a portion where the gas generating agent is accommodated toward the one end portion of the housing. In that case, the heat insulating layer may be provided between the circumferential wall portion and the cylindrical portion by the increased diameter portion abutting on the circumferential wall portion.

The gas generator based on the first aspect of the present invention may further include a guide member inserted in the circumferential wall portion at a position on the side of the one end portion of the housing. In that case, the heat insulating layer may be provided between the circumferential wall portion and the cylindrical portion by inserting the axial end portion of the cylindrical portion on the side of the igniter into the guide member.

A gas generator based on a second aspect of the present invention includes a housing, an igniter, a partition portion, an autoignition agent, and a division member. The housing is formed from an elongated cylindrical member having axial one and the other end portions closed and having a circumferential wall portion. The igniter is assembled to the one end portion of the housing, and serves to burn a gas generating agent. The partition portion partitions a space in the housing in the axial direction of the circumferential wall portion such that a combustion chamber where the gas generating agent is accommodated is formed at a position on a side of the one end portion of the housing and a filter chamber where a filter is arranged is formed at a position on a side of the other end portion of the housing. The autoignition agent is arranged in the housing and is in a form of a pellet for burning the gas generating agent by self-igniting without depending on activation of the igniter. The division member divides in the axial direction of the circumferential wall portion, the combustion chamber into a space on the side of the one end portion of the housing and a space on a side of the other end portion of the housing. The gas generating agent is arranged in the space on the side of the one end portion of the housing in the combustion chamber divided by the division member and the autoignition agent is arranged in the space on the side of the other end portion of the housing in the combustion chamber divided by the division member. The filter includes a hollow portion which extends from an axial end portion which faces the partition portion in the axial direction of the circumferential wall portion toward the other end portion of the housing. The autoignition agent is smaller in diameter than the hollow portion of the filter. The division member includes a recess in a portion facing the partition portion in the axial direction of the circumferential wall portion. In the gas generator based on the second aspect of the present invention, at least some of the autoignition agent is accommodated in the recess provided in the division member so that, when viewed in the axial direction of the circumferential wall portion, the autoignition agent is positioned and arranged so as not to overlap with a portion of the filter except for the hollow portion.

The gas generator based on the second aspect of the present invention may further include an accommodation chamber defining member arranged in the combustion chamber, the accommodation chamber defining member defining a space where the gas generating agent is accommodated and a space where the autoignition agent is accommodated. In that case, the accommodation chamber defining member may include a cylindrical container body with bottom which includes a cylindrical portion extending in a direction in parallel to the axial direction of the circumferential wall portion and a bottom portion closing an axial end portion of the cylindrical portion on a side of the filter chamber. In that case, preferably, the division member is inserted in the cylindrical portion such that an outer edge of the division member abuts on an inner circumferential surface of the cylindrical portion, and the autoignition agent preferably abuts on the bottom portion.

In the gas generator based on the second aspect of the present invention, the partition portion may include a cylindrical separation wall member with bottom inserted in the circumferential wall portion. In that case, preferably, a heat insulating layer is provided in at least a part between the circumferential wall portion and the cylindrical portion by inserting the axial end portion of the cylindrical portion on the side of the filter chamber into the separation wall member.

Advantageous Effects of Invention

According to the present invention, a gas generator reduced in size and weight and improved in safety as compared with a conventional example can be obtained.

DESCRIPTION OF EMBODIMENTS

Figure 1:
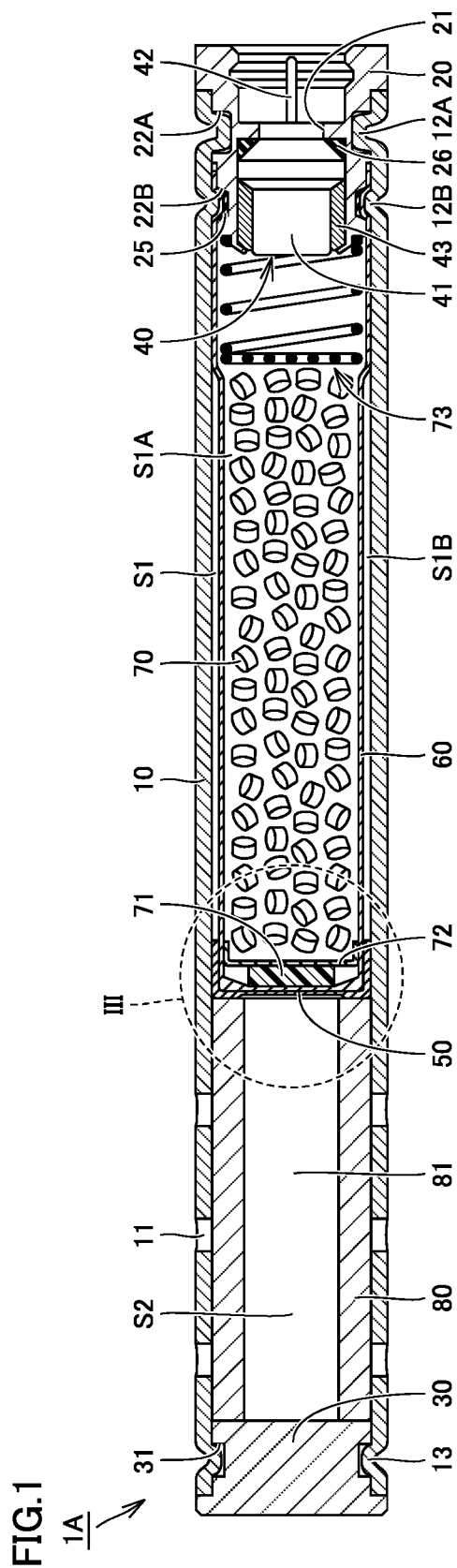
FIG. 1 is a schematic diagram of a cylinder type gas generator in a first embodiment of the present invention.

An embodiment of the present invention will be described hereinafter in detail with reference to the drawings. An embodiment shown below represents application of the present invention to a cylinder type gas generator incorporated in a side air bag apparatus. The same or common elements in embodiments shown below have the same reference characters allotted in the drawings and description thereof will not be repeated.

First Embodiment

Figure 2:
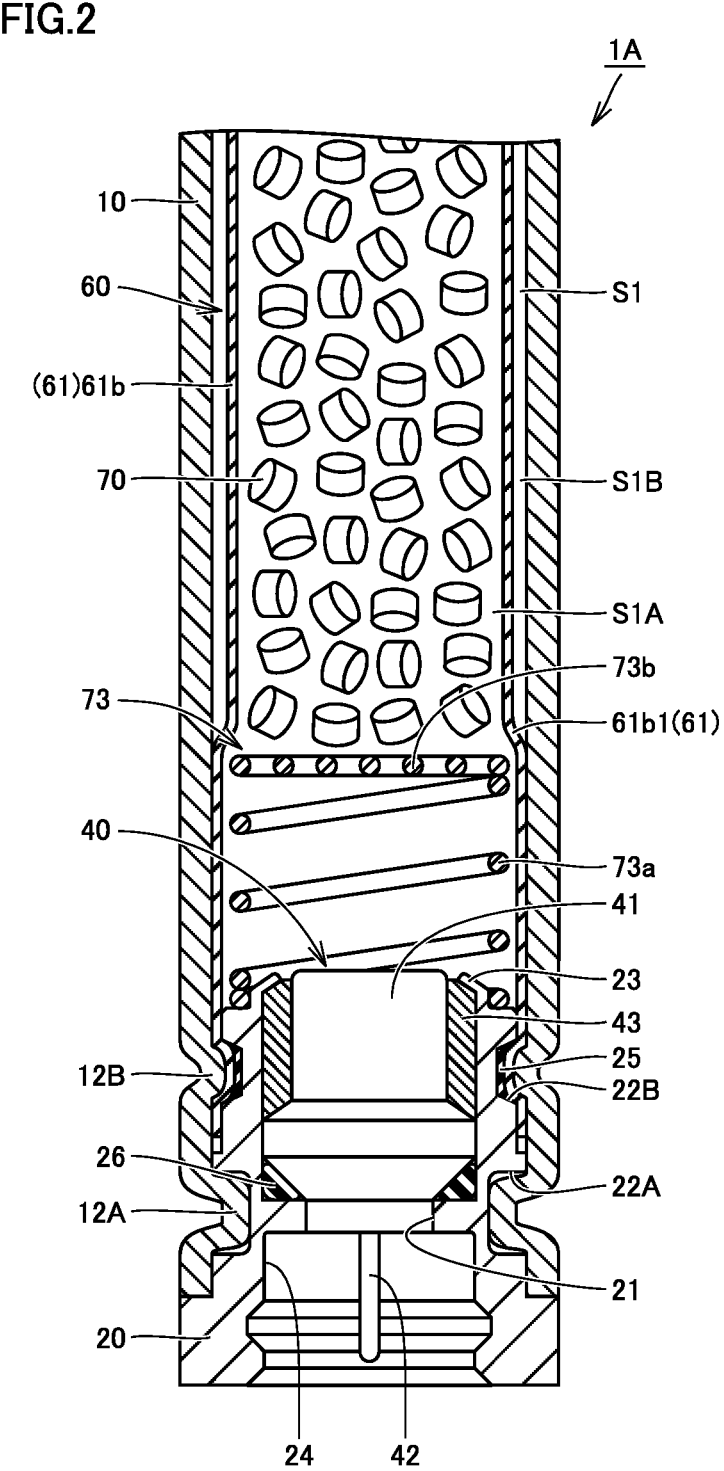
FIG. 2 is an enlarged cross-sectional view of a portion in the vicinity of an igniter of the cylinder type gas generator shown in FIG. 1.
Figure 3:
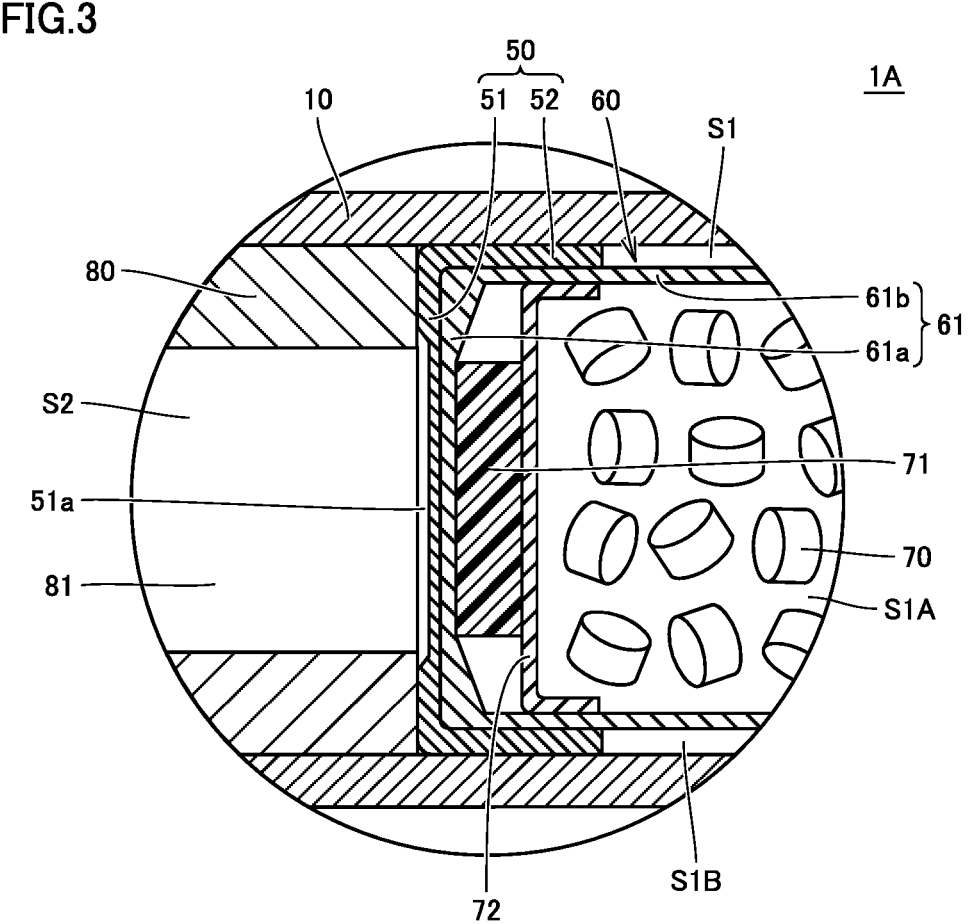
FIG. 3 is an enlarged cross-sectional view of a portion in the vicinity of a partition portion of the cylinder type gas generator shown in FIG. 1.

FIG. 1 is a schematic diagram of a cylinder type gas generator in a first embodiment of the present invention. FIGS. 2 and 3 are an enlarged cross-sectional view of a portion in the vicinity of an igniter and an enlarged cross-sectional view of a portion in the vicinity of a partition portion, of the cylinder type gas generator shown in FIG. 1, respectively. FIG. 3 corresponds to a region III shown in FIG. 1. A construction of a cylinder type gas generator 1A in the present embodiment will be described below with reference to FIGS. 1 to 3.

As shown in FIG. 1, cylinder type gas generator 1A in the present embodiment has an elongated columnar outer geometry and has an elongated cylindrical housing having closed one and the other end portions located in an axial direction. The housing includes a housing main body 10, a holder 20, and a closing member 30.

An igniter 40, a separation wall member 50, an accommodation chamber defining member 60, a gas generating agent 70, an autoignition agent 71, and a filter 80 as internal components are accommodated in the housing constituted of housing main body 10, holder 20, and closing member 30. In the housing, a combustion chamber S1 where gas generating agent 70 among the internal components described above is mainly arranged and a filter chamber S2 where filter 80 is arranged are located.

Housing main body 10 is made of an elongated cylindrical member which implements a circumferential wall portion of the housing and has an opening provided at each of opposing ends in the axial direction. Holder 20 is formed from a cylindrical member including a through portion 21 which extends in a direction the same as the axial direction of housing main body 10, and includes in its outer circumferential surface, an annular groove portion 22A for fixing by swaging which will be described later. Closing member 30 is formed from a member in a shape of a disc having a prescribed thickness and includes in its circumferential surface, an annular groove portion 31 for fixing by swaging which will be described later. Annular groove portions 22A and 31 for fixing by swaging are provided in the outer circumferential surface of holder 20 and the circumferential surface of closing member 30, respectively, as extending in the circumferential direction.

Housing main body 10 may be formed from a member made of a metal such as stainless steel, iron steel, an aluminum alloy, or a stainless alloy or from a cylindrically formed press-formed product by press-working of a rolled steel plate represented by SPCE. Alternatively, housing main body 10 may be formed from an electric resistance welded tube represented by STKM.

In particular, when housing main body 10 is formed from a press-formed product of a rolled steel plate or an electric resistance welded tube, housing main body 10 can be formed more inexpensively and readily and with much lighter weight than when the housing main body is formed from a member made of a metal such as stainless steel or iron steel.

Holder 20 and closing member 30 are formed from a member made of a metal such as stainless steel, iron steel, an aluminum alloy, or a stainless alloy.

Holder 20 is fixed to housing main body 10 so as to close one axial opening end of housing main body 10. Specifically, while holder 20 is inserted in one opening end of housing main body 10, housing main body 10 in a portion corresponding to annular groove portion 22A provided in the outer circumferential surface of holder 20 is engaged with annular groove portion 22A as being decreased in diameter radially inward, so that holder 20 is fixed by swaging to housing main body 10. Thus, one axial end portion of the housing is implemented by holder 20.

Closing member 30 is fixed to housing main body 10 so as to close the other axial opening end of housing main body 10. Specifically, while closing member 30 is inserted in the other opening end of housing main body 10, housing main body 10 in a portion corresponding to annular groove portion 31 provided in the circumferential surface of closing member 30 is engaged with annular groove portion 31 as being decreased in diameter radially inward so that closing member 30 is fixed by swaging to housing main body 10. The other axial end portion of the housing is thus implemented by closing member 30.

Such fixing by swaging is called omnidirectional swaging in which housing main body 10 is substantially uniformly decreased in diameter radially inward. With such omnidirectional swaging, swaging portions 12A and 13 are provided in housing main body 10. Swaging portions 12A and 13 are thus in direct contact with annular groove portions 22A and 31, respectively, so that a gap is prevented from being provided therebetween.

In addition to annular groove portion 22A for fixing by swaging described above, yet another annular groove portion 22B is provided in the outer circumferential surface of holder 20. Details of annular groove portion 22B will be described later.

A structure for assembly of holder 20 and closing member 30 to housing main body 10 is not limited to the assembly structure described above, and another assembly structure may be adopted. Alternatively, housing main body 10 and closing member 30 do not have to be separate members, and they may be implemented as one member in a shape of a cylinder with bottom.

As shown in FIGS. 1 and 2, igniter 40 is assembled to above-described one axial end portion of the housing by being supported by holder 20. Igniter 40 serves to burn gas generating agent 70 and is set to face a space in the housing.

Igniter 40 includes an ignition portion 41 and a pair of terminal pins 42. In ignition portion 41, a resistor (bridge wire) is attached to be connected to the pair of terminal pins 42, and an ignition agent is loaded in ignition portion 41 so as to surround the resistor or to be in contact with the resistor. An enhancer agent may be loaded in ignition portion 41 as necessary.

Here, a Nichrome wire or a resistance wire made of an alloy containing platinum and tungsten is generally used as a resistor, and ZPP (zirconium potassium perchlorate), ZWPP (zirconium tungsten potassium perchlorate), lead tricinate, or the like is generally made use of as the ignition agent. A composition composed of metal powders/oxidizing agent represented by $B/KNO_3$, $B/NaNO_3$, or $Sr(NO_3)_2$, a composition composed of titanium hydride/potassium perchlorate, or a composition composed of B/5-aminotetrazole/potassium nitrate/molybdenum trioxide is employed as the enhancer agent. A squib cup defining an outer surface of ignition portion 41 is generally made of a metal or plastic.

Upon sensing collision, a prescribed amount of current flows in a resistor through terminal pin 42. As the prescribed amount of current flows in the resistor, Joule heat is generated in the resistor and the ignition agent starts burning. Thermal particles at a high temperature caused by burning burst a squib cup accommodating the ignition agent. A time period from flow of a current in the resistor until activation of igniter 40 is generally not longer than 2 milliseconds in a case that the Nichrome wire is employed as the resistor.

A combustion control cover 43 in a substantially cylindrical shape made of a metal is externally attached to ignition portion 41 of igniter 40. Combustion control cover 43 serves to efficiently guide thermal particles generated in igniter 40 at the time of activation to gas generating agent 70, and more specifically, it gives directivity to a direction of travel of thermal particles generated in ignition portion 41 of igniter 40.

Specifically, ignition portion 41 is surrounded by combustion control cover 43, so that an opening is provided mainly at a tip end portion located on a side of gas generating agent 70 of the squib cup defining an outer surface of ignition portion 41 when the squib cup bursts. Accordingly, a direction of travel of thermal particles generated in ignition portion 41 is narrowed to the axial direction of housing main body 10.

Therefore, by providing combustion control cover 43 as described above, thermal particles generated in igniter 40 can efficiently be guided to gas generating agent 70.

Igniter 40 and combustion control cover 43 are fixed to holder 20 by a swaging portion 23 provided in holder 20. More specifically, holder 20 includes swaging portion 23 for fixing by swaging of igniter 40 and combustion control cover 43 at the axial end portion which faces a space in the housing. Swaging portion 23 described above is fixed by swaging while igniter 40 to which combustion control cover 43 is attached is inserted in through portion 21 and abuts on a wall portion in a portion defining through portion 21 of holder 20, so that igniter 40 and combustion control cover 43 are fixed to holder 20 as being held by holder 20.

A sealing material 26 formed, for example, from an O ring is interposed between holder 20 and igniter 40. Sealing material 26 serves to prevent a gap from being provided between holder 20 and igniter 40, and the sealing material hermetically seals a space in the housing.

A depression portion 24 continuous to through portion 21 described above is provided at the axial end portion of holder 20 exposed to the outside. Depression portion 24 provides a female connector portion which receives a male connector (not shown) of a harness for connecting igniter 40 and a control unit (not shown) to each other, and a portion close to a tip end of terminal pin 42 of igniter 40 is located as being exposed in depression portion 24. A male connector is inserted in depression portion 24 serving as the female connector portion so that electrical conduction between a core of the harness and terminal pin 42 is achieved.

A structure for assembly of igniter 40 to holder 20 and a structure for sealing between holder 20 and igniter 40 are not limited to the assembly structure and the sealing structure described above, and another assembly structure and another sealing structure may be adopted.

As shown in FIGS. 1 and 3, separation wall member 50 as a partition portion is arranged at a prescribed position in the space in the housing. Separation wall member 50 is a member for partitioning the space in the housing into combustion chamber S1 and filter chamber S2 in the axial direction.

Separation wall member 50 is in a shape of a cylinder with bottom, and formed from a member made of a metal such as stainless steel, iron steel, an aluminum alloy, or a stainless alloy. Separation wall member 50 includes a separation wall portion 51 in a form of a flat plate arranged to be orthogonal to the axial direction of housing main body 10 and an annular wall portion 52 in a form of a cylindrical wall erected from an outer edge portion of separation wall portion 51. Separation wall member 50 is arranged such that a main surface on an outer side of separation wall portion 51 abuts on filter 80 and an outer circumferential surface of annular wall portion 52 abuts on an inner circumferential surface of housing main body 10.

A score 51*a* is provided in a main surface of separation wall portion 51 which abuts on filter 80. Score 51*a* serves to provide an opening as a result of cleavage of separation wall portion 51 with increase in internal pressure in combustion chamber S1 as a result of burning of gas generating agent 70, and it is provided, for example, as a plurality of grooves provided to radially intersect with one another. Score 51*a* is provided in a portion in filter 80 opposed to a hollow portion 81.

As shown in FIGS. 1 to 3, in a space (that is, combustion chamber S1) lying between holder 20 and separation wall member 50 in the space in the housing, accommodation chamber defining member 60, gas generating agent 70, autoignition agent 71, a division member 72, and a coil spring 73 are arranged.

Accommodation chamber defining member 60 is a member which defines a gas generating agent accommodation chamber S1A which accommodates gas generating agent 70, and it is formed from a relatively weak member so as to burst or melt with burning of gas generating agent 70 at the time of activation. The accommodation chamber defining member is formed from a press-formed product made of a metal such as copper, aluminum, a copper alloy, an aluminum alloy, or the like, or a resin molding formed by injection molding or sheet forming. In the present embodiment, accommodation chamber defining member 60 is formed from a member made of a metal.

More specifically, accommodation chamber defining member 60 is formed from a generally elongated and substantially cylindrical container body 61, and container body 61 includes a bottom portion 61*a* in a form of a flat plate arranged as being orthogonal to the axial direction of housing main body 10 and a cylindrical portion 61*b* erected from an outer edge portion of bottom portion 61*a*. Container body 61 is arranged such that bottom portion 61*a* is located on a side of separation wall member 50 and an opening end thereof is located on a side of holder 20.

The axial end portion of container body 61 on a side where bottom portion 61*a* is located is inserted in the opening end of separation wall member 50, and the end portion of cylindrical portion 61*b* located on the side of bottom portion 61*a* abuts on annular wall portion 52 of separation wall member 50.

An increased diameter portion 61*b*1 is provided in cylindrical portion 61*b* in a portion of container body 61 located on a side of the opening end. Increased diameter portion 61*b*1 includes a portion formed to spread radially outward from cylindrical portion 61*b* located on the side of bottom portion 61a relative to the portion where increased diameter portion 61b1 is provided, and an outer circumferential surface of increased diameter portion 61b1 abuts on the inner circumferential surface of housing main body 10.

Gas generating agent 70 is accommodated in a space inside a portion of cylindrical portion 61b of container body 61 except for increased diameter portion 61b1, and gas generating agent accommodation chamber S1A is defined by cylindrical portion 61b in that portion and bottom portion 61a.

According to the construction as such, most part of cylindrical portion 61b of container body 61 in the portion defining gas generating agent accommodation chamber S1A where gas generating agent 70 is accommodated is arranged at a prescribed distance from the inner circumferential surface of housing main body 10, so that a heat insulating layer S1B is provided along the axial direction of combustion chamber S1. Functions of heat insulating layer S1B will be described later.

Increased diameter portion 61b1 of cylindrical portion 61b corresponds to an extension portion which extends from the portion of container body 61 defining gas generating agent accommodation chamber S1A toward the opening end of container body 61, and an end portion of increased diameter portion 61b1 is interposed between housing main body 10 and holder 20 by reaching a portion therebetween.

Referring to FIGS. 1 and 2, the outer circumferential surface of holder 20 includes annular groove portion 22B provided to extend along the circumferential direction in the outer circumferential surface of holder 20, in addition to annular groove portion 22A described above. Annular groove portion 22B is disposed at a position on a side of combustion chamber S1 relative to annular groove portion 22A, and the end portion of increased diameter portion 61b1 of container body 61 described above reaches annular groove portion 22B without reaching annular groove portion 22A.

A swaging portion 12B is provided in housing main body 10 in a portion corresponding to annular groove portion 22B. Similarly to swaging portions 12A and 13 described above, swaging portion 12B is formed by fixing by swaging called omnidirectional swaging in which housing main body 10 is substantially uniformly decreased in diameter radially inward, and located along the circumferential direction of housing main body 10.

Swaging portion 12B is provided so that the end portion of increased diameter portion 61b1 of container body 61 arranged as being interposed between housing main body 10 and holder 20 is held between swaging portion 12B and annular groove portion 22B. Container body 61 is thus fixed to housing main body 10 and holder 20.

An annular sealing material 25 formed from an elastic body is interposed between annular groove portion 22B provided in the outer circumferential surface of holder 20 and swaging portion 12B provided in housing main body 10. Sealing material 25 is a member for preventing a gap from being provided between holder 20 and housing main body 10 by being held by annular groove portion 22B and swaging portion 12B.

Sealing material 25 thus comes in intimate contact with annular groove portion 22B and swaging portion 12B, so that the space in the housing is hermetically sealed in that portion from the outside. For example, an O ring composed of various types of rubber can be employed as sealing material 25, and in addition, a product obtained by applying a liquid sealant such as a silicone resin in advance to annular groove portion 22B or housing main body 10 and curing the same may be employed as sealing material 25.

As shown in FIGS. 1 to 3, gas generating agent 70, autoignition agent 71, division member 72, and coil spring 73 are arranged in the space in container body 61. More specifically, autoignition agent 71 and division member 72 are arranged at the end portion on the side of separation wall member 50 in the space in container body 61, coil spring 73 is arranged at the end portion on the side of holder 20 in the space in container body 61, and gas generating agent 70 is arranged in a portion except for the end portion on the side of separation wall member 50 and the end portion on the side of holder 20 in the space in container body 61.

Division member 72 is a member for dividing the space in container body 61 in the axial direction and formed from a relatively weak member so as to burst or melt with burning of gas generating agent 70 at the time of activation. The division member is formed from a member in a shape of a cup made from a press-formed product made of a metal such as copper, aluminum, a copper alloy, an aluminum alloy, or the like, or a resin molding formed by injection molding or sheet forming.

Division member 72 is located as being in contact with both of gas generating agent 70 and autoignition agent 71 and as being held thereby. An outer edge portion of division member 72 preferably abuts on cylindrical portion 61b of container body 61.

Gas generating agent 70 is an agent which is ignited by thermal particles generated as a result of activation of igniter 40 and produces gas as it burns. A non-azide-based gas generating agent is preferably employed as gas generating agent 70, and gas generating agent 70 is formed as a molding generally containing a fuel, an oxidizing agent, and an additive.

For the fuel, for example, a triazole derivative, a tetrazole derivative, a guanidine derivative, an azodicarbonamide derivative, a hydrazine derivative, or the like, or combination thereof is made use of. Specifically, for example, nitroguanidine, guanidine nitrate, cyanoguanidine, 5-aminotetrazole, and the like are suitably made use of.

As the oxidizing agent, for example, basic nitrate such as basic copper nitrate, perchlorate such as ammonium perchlorate or potassium perchlorate, nitrate containing cations selected from an alkali metal, an alkali earth metal, a transition metal, and ammonia, or the like is made use of. As the nitrate, for example, sodium nitrate, potassium nitrate, or the like is suitably made use of.

As the additive, a binder, a slag formation agent, a combustion modifier, or the like is exemplified. As the binder, for example, an organic binder such as polyvinyl alcohol, metal salt of carboxymethyl cellulose, and stearate, or an inorganic binder such as synthetic hydrotalcite and Japanese acid clay can suitably be made use of. In addition, as the binder, polysaccharide derivatives such as hydroxyethyl cellulose, hydroxypropyl methylcellulose, cellulose acetate, cellulose propionate, cellulose acetate butyrate, nitrocellulose, microcrystalline cellulose, guar gum, polyvinyl pyrrolidone, polyacrylamide, and starch and inorganic binders such as molybdenum disulfide, talc, bentonite, diatomite, kaolin, and alumina can also suitably be made use of. As the slag formation agent, silicon nitride, silica, Japanese acid clay, or the like can suitably be made use of. As the combustion modifier, a metal oxide, ferrosilicon, activated carbon, graphite, or the like can suitably be made use of.

A shape of a molding of gas generating agent 70 includes various shapes such as a particulate shape including a granule, a pellet, and a column, and a disc shape. Among columnar moldings, a molding with holes having through holes in the molding (such as a cylindrical shape with a single hole or a cylindrical shape with multiple holes) is also made use of. These shapes are preferably selected as appropriate depending on specifications of an air bag apparatus in which cylinder type gas generator 1A is incorporated, and for example, a shape optimal for the specifications is preferably selected by selecting a shape allowing change over time of a rate of generation of gas during burning of gas generating agent 70. Furthermore, in addition to a shape of gas generating agent 70, a size of a molding or an amount thereof for filling is preferably selected as appropriate, in consideration of a linear burning velocity, a pressure exponent, or the like of gas generating agent 70.

Autoignition agent 71 is an agent which self-ignites without depending on activation of igniter 40, and arranged to abut on bottom portion 61a of container body 61. More specifically, autoignition agent 71 is made of pellets formed in a columnar shape of a flat profile and comes in contact with bottom portion 61a of container body 61 and division member 72 as being held by bottom portion 61a and division member 72.

Autoignition agent 71 is an agent lower in spontaneous combustion temperature than gas generating agent 70, and it serves not to induce an abnormal operation due to external heating of cylinder type gas generator 1A in case of fire in a vehicle equipped with an air bag apparatus incorporating cylinder type gas generator 1A.

Coil spring 73 is provided for the purpose of preventing gas generating agent 70 made of a molding from being crushed by vibration or the like, and has a spring portion 73a formed by bending a metal wire rod and a pressing portion 73b. Spring portion 73a is arranged such that one end thereof abuts on holder 20 and pressing portion 73b is formed at the other end. Pressing portion 73b is provided by arranging, for example, metal wire rods substantially in parallel to each other at a prescribed interval, and abuts on gas generating agent 70.

Thus, gas generating agent 70 is elastically biased toward separation wall member 50 by coil spring 73 and prevented from moving in the housing. Instead of coil spring 73 as described above, a cushion material formed from a member made, for example, of a molding of ceramic fibers, rock wool, a foamed resin (such as foamed silicone, foamed polypropylene, or foamed polyethylene), or rubber represented by chloroprene and EPDM may be made use of.

As shown in FIG. 1, in the space in the housing, filter 80 is arranged in the space (that is, filter chamber S2) lying between closing member 30 and separation wall member 50. Filter 80 is formed from a cylindrical member having hollow portion 81 extending in a direction the same as the axial direction of housing main body 10, and has axial one end surface abutting on closing member 30 and axial the other end surface abutting on separation wall member 50.

Filter 80 functions as cooling means for cooling gas by removing heat from the gas at a high temperature when the gas produced as a result of burning of gas generating agent 70 passes through this filter 80 and also functions as removal means for removing slag (residues) or the like contained in the gas. As described above, by making use of filter 80 formed from a cylindrical member, a flow resistance against gas which flows through filter chamber S2 at the time of activation is suppressed and an efficient flow of the gas can be achieved.

A filter formed from an aggregate of metal wire rods or metal mesh materials suitably made of stainless steel or iron steel can be made use of as filter 80. Specifically, a wire gauze of stocking stitch, a plain-woven wire gauze, an aggregate of crimped metal wire rods, or a material obtained by compressing the former with the use of a press can be made use of.

Alternatively, a material obtained by winding a perforated metal plate can also be made use of as filter 80. In this case, as the perforated metal plate, for example, expanded metal obtained by making staggered cuts in a metal plate and providing holes by widening the cuts to thereby work the metal plate in a mesh, hook metal obtained by perforating a metal plate and collapsing burrs caused around a periphery of the hole for flattening, or the like can be made use of.

A plurality of gas discharge openings 11 are provided along the circumferential direction and the axial direction in housing main body 10 in a portion defining filter chamber S2. The plurality of gas discharge openings 11 serve for guiding gas which has passed through filter 80 to the outside of the housing.

An operation of cylinder type gas generator 1A in the present embodiment when it is activated will now be described with reference to FIG. 1.

With reference to FIG. 1, when a vehicle on which cylinder type gas generator 1A in the present embodiment is mounted collides, collision is sensed by collision sensing means separately provided in the vehicle and igniter 40 is activated based thereon by current feed caused by a control unit separately provided in the vehicle.

When igniter 40 is activated, an ignition agent or an enhancer agent in addition thereto burns. Then, a pressure in ignition portion 41 increases, which bursts ignition portion 41, and thermal particles flow to the outside of ignition portion 41. The thermal particles which have flowed out reach gas generating agent 70.

The thermal particles which have reached gas generating agent 70 burn gas generating agent 70 so that a large amount of gas is produced. Accordingly, a pressure and a temperature in gas generating agent accommodation chamber S1A increase and container body 61 and division member 72 burst or melt, and furthermore, autoignition agent 71 burns.

As container body 61 bursts or melts, a pressure in the entire combustion chamber S1 further increases and an internal pressure in combustion chamber S1 reaches a prescribed pressure. Thus, a portion of separation wall member 50 where score 51a is provided ruptures. Thus, a communication hole is provided in separation wall member 50 in a portion opposed to hollow portion 81 of filter 80, and combustion chamber S1 and filter chamber S2 communicate with each other through the communication hole.

The communication hole is provided in separation wall member 50, so that gas produced in combustion chamber S1 flows into filter chamber S2. The gas which has flowed into filter chamber S2 flows along the axial direction through hollow portion 81 of filter 80, thereafter changes its direction toward a radial direction, and passes through filter 80. At that time, heat is removed through filter 80 and the gas is cooled, and slag contained in the gas is removed by filter 80.

The gas which has passed through filter 80 is discharged to the outside of the housing through gas discharge opening 11. The discharged gas is introduced into an air bag provided adjacently to cylinder type gas generator 1A to thereby expand and develop the air bag.

Referring to FIGS. 1 to 3, in cylinder type gas generator 1A in the present embodiment, cylindrical heat insulating layer S1B is provided between accommodation chamber defining member 60 in which gas generating agent 70 is accommodated and housing main body 10 as described above. According to such a construction, increase in temperature of gas generating agent 70 due to external heating even in case of fire in a vehicle equipped with an air bag apparatus incorporating cylinder type gas generator 1A can effectively be suppressed.

By providing heat insulating layer S1B in a portion radially outside gas generating agent accommodation chamber S1A where gas generating agent 70 is accommodated, heat insulating layer S1B serves as a thermal resistance and heat of housing main body 10 is less likely to conduct to gas generating agent 70, and consequently, increase in temperature of gas generating agent 70 can be suppressed.

Heat insulating layer S1B is preferably lower in thermal conductivity than housing main body 10, and it is provided as an air layer in the present embodiment. Heat insulating layer S1B, however, does not necessarily have to be provided as the air layer, and it may be provided as a gas layer filled with another gas or as a vacuum layer. In addition, heat insulating layer S1B may be provided by arranging various heat insulating members in the space.

Autoignition agent 71 is in thermal contact with housing main body 10 substantially through a shortest path with division member 72 which is a member made of a metal, the end portion of container body 61 close to bottom portion 61a as accommodation chamber defining member 60 which is a member made of a metal, and separation wall member 50 which is a member made of a metal being interposed. Therefore, autoignition agent 71 is efficiently heated in case of fire.

Cylinder type gas generator 1A in the present embodiment is thus constructed such that external heat is less likely to conduct to gas generating agent 70 but is more likely to conduct to autoignition agent 71.

Therefore, timing of exhibition of the autoignition operation started as a result of spontaneous ignition of autoignition agent 71 in case of fire in a vehicle becomes earlier, and consequently a temperature of gas generating agent 70 at the time when the autoignition operation is exhibited can be suppressed. Therefore, increase in internal pressure in the housing at the time of the autoignition operation can significantly be suppressed.

Thus, not only break of the housing can more reliably be prevented but also a withstanding pressure required of the housing can further be suppressed. Consequently, the housing can be smaller in thickness (in particular, a thickness of housing main body 10) and the cylinder type gas generator 1A can also be reduced in size and weight as compared with the conventional example.

Therefore, by adopting the construction, cylinder type gas generator 1A reduced in size and weight and improved in safety as compared with the conventional example can be obtained.

In order to promote conduction of external heat to autoignition agent 71, preferably, not only the end portion of cylindrical portion 61b located on the side of bottom portion 61a of container body 61 abuts on annular wall portion 52 of separation wall member 50 as described above but also an outer surface of bottom portion 61a of container body 61 further abuts on separation wall portion 51 of separation wall member 50 as illustrated.

In cylinder type gas generator 1A in the present embodiment, the construction is not such that a sealing material such as an O ring is provided somewhere on the housing so as to hermetically seal combustion chamber S1 itself from the outside (particularly in the vicinity of separation wall member 50 as the partition portion) but such that container body 61 provided in combustion chamber S1 as well as holder 20 and igniter 40 provided adjacently to combustion chamber S1 independently hermetically seal from the outside, gas generating agent accommodation chamber S1A where gas generating agent 70 is arranged. Therefore, no hole is provided in cylindrical portion 61b of container body 61.

Therefore, cylinder type gas generator 1A in the present embodiment is different in construction from what is called a dual-wall cylinder type gas generator in which a cylindrical body provided with holes in a circumferential wall is coaxially laid over a housing.

(Modification)

Figure 4:
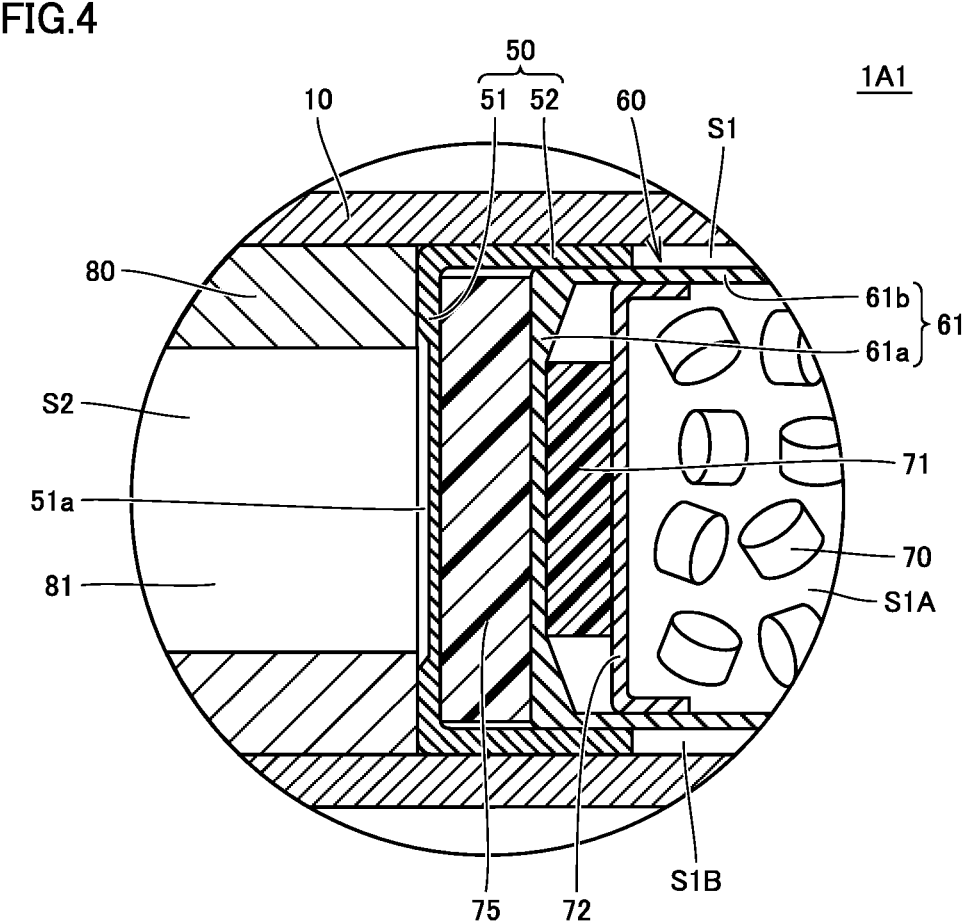
FIG. 4 is an enlarged cross-sectional view of a portion in the vicinity of the partition portion of a cylinder type gas generator according to a modification.

FIG. 4 is an enlarged cross-sectional view of a portion in the vicinity of the partition portion of a cylinder type gas generator according to a modification. A cylinder type gas generator 1A1 according to the present modification will be described below with reference to FIG. 4.

As shown in FIG. 4, cylinder type gas generator 1A1 according to the present modification is different from cylinder type gas generator 1A in the first embodiment described above only in construction in the vicinity of separation wall member 50 as the partition portion.

Specifically, in cylinder type gas generator 1A1 according to the present modification, a cushion material 75 is arranged in a space inside separation wall member 50, and cushion material 75 is held by bottom portion 61a of container body 61 and separation wall portion 51 of separation wall member 50.

Cushion material 75 is a member which accommodates variation in dimension of various components accommodated in the housing, and it is formed from a member made, for example, of a molding of ceramic fibers, rock wool, a foamed resin (such as foamed silicone, foamed polypropylene, or foamed polyethylene), or rubber represented by chloroprene and EPDM.

According to such a construction as well, an effect the same as the effect described in the first embodiment above can be obtained, and furthermore, such an effect that various components can be arranged in the space in the housing of a determined size with high yields is obtained.

Second Embodiment

Figure 5:
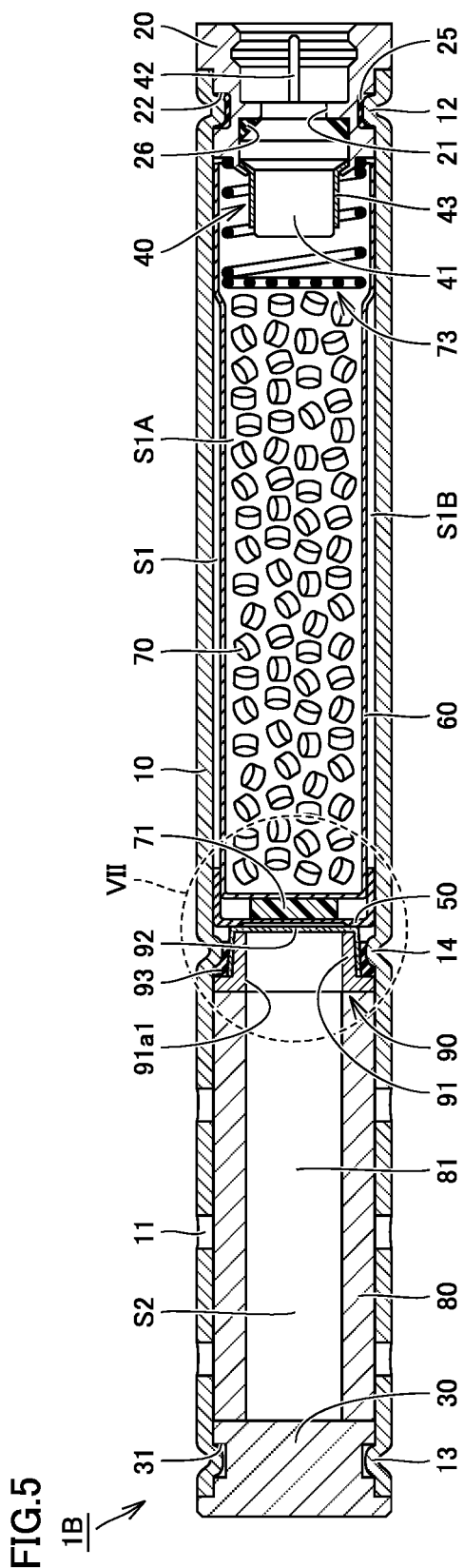
FIG. 5 is a schematic diagram of a cylinder type gas generator in a second embodiment of the present invention.
Figure 6:
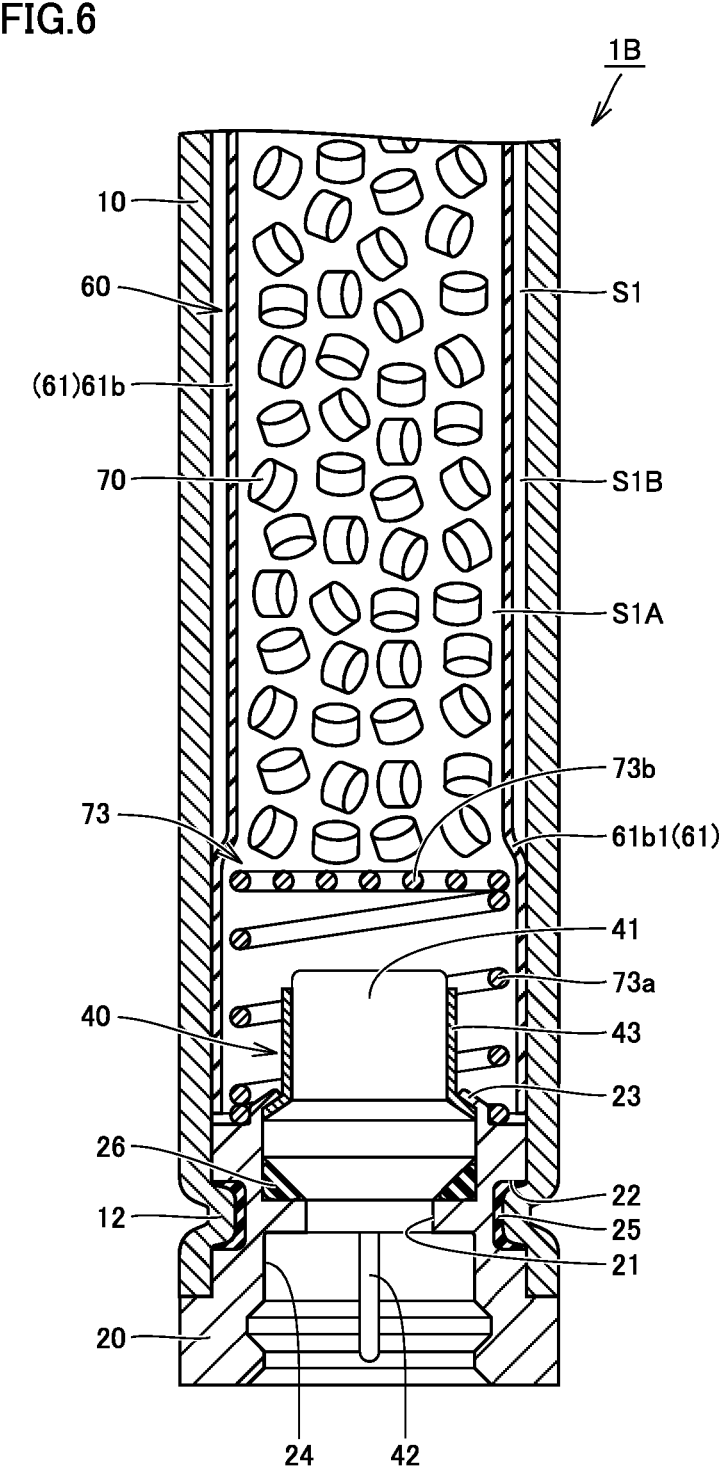
FIG. 6 is an enlarged cross-sectional view of a portion in the vicinity of the igniter of the cylinder type gas generator shown in FIG. 5.
Figure 7:
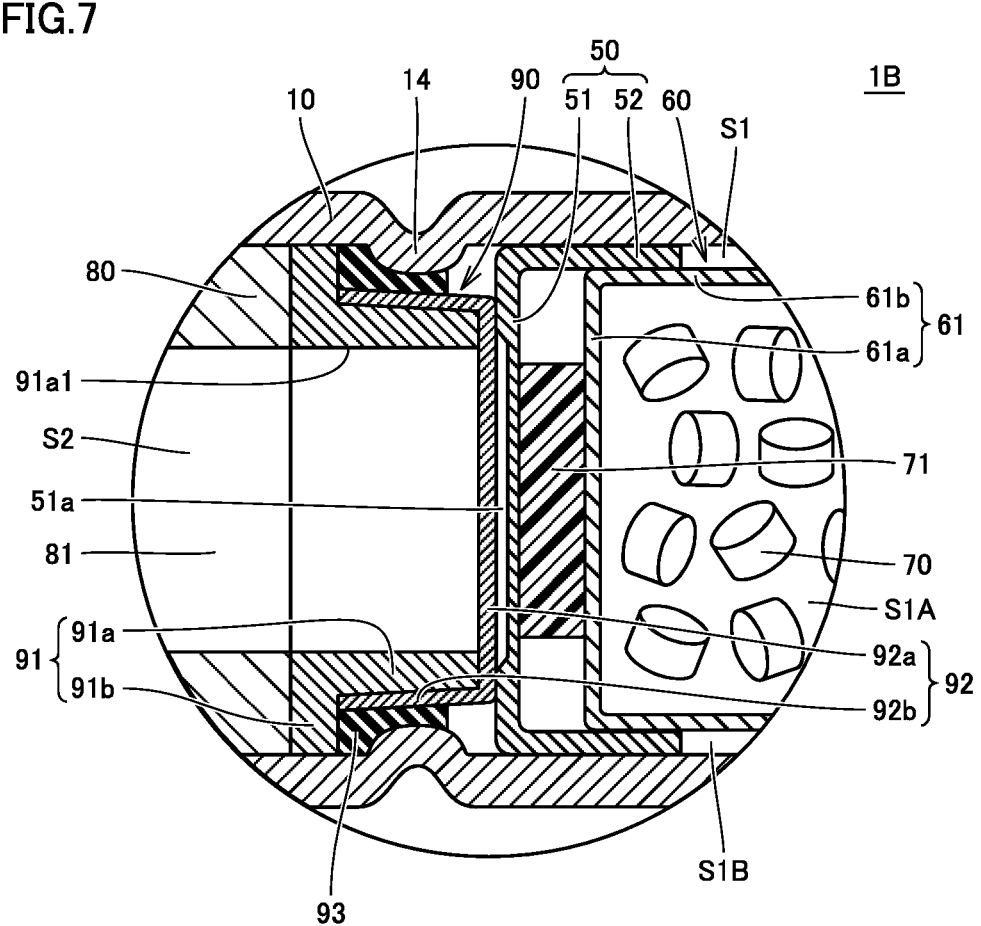
FIG. 7 is an enlarged cross-sectional view of a portion in the vicinity of the partition portion of the cylinder type gas generator shown in FIG. 5.

FIG. 5 is a schematic diagram of a cylinder type gas generator in a second embodiment of the present invention. FIGS. 6 and 7 are an enlarged cross-sectional view of a portion in the vicinity of the igniter and an enlarged cross-sectional view of a portion in the vicinity of the partition portion, of the cylinder type gas generator shown in FIG. 5, respectively. FIG. 7 corresponds to a region VII shown in FIG. 5. A cylinder type gas generator 1B in the present embodiment will be described below with reference to FIGS. 5 to 7.

As shown in FIGS. 5 to 7, unlike cylinder type gas generator 1A in the first embodiment described above, cylinder type gas generator 1B in the present embodiment is provided with a sealing material such as an O ring on the housing so as to hermetically seal combustion chamber S1 itself from the outside. Cylinder type gas generator 1B, however, is different from what is called a dual-wall cylinder type gas generator in which a cylindrical body provided with holes in a circumferential wall is coaxially laid over a housing in that container body 61 is arranged in combustion chamber S1 and no hole is provided in cylindrical portion 61b of container body 61.

Cylinder type gas generator 1B in the present embodiment is different from cylinder type gas generator 1A in the first embodiment described above mainly in construction of the partition portion which serves as a partition between combustion chamber S1 and filter chamber S2 and a structure for assembly of the end portion of accommodation chamber defining member 60 on the side of holder 20 to the housing.

Specifically, in cylinder type gas generator 1B in the present embodiment, a partition member 90 is arranged in a portion in the housing between separation wall member 50 and filter 80. Partition member 90 implements, together with separation wall member 50, a partition portion which serves as a partition between combustion chamber S1 and filter chamber S2.

Partition member 90 includes a base body 91 formed from a member made of a metal, a closing body 92 formed from a member made of a metal or a resin, and a sealing material 93 formed from an elastic body represented by various types of rubber. Base body 91 is formed from a part constructed to have a large thickness so as to be relatively high in rigidity and closing body 92 is formed from a part constructed to have a small thickness so as to be relatively low in rigidity.

As shown in FIG. 7, base body 91 includes a cylindrical base portion 91a arranged substantially coaxially with housing main body 10 and a flange portion 91b which extends radially outward from an end portion of base portion 91a on the side of filter chamber S2. Base portion 91a defines a communication hole 91a1 for communication between combustion chamber S1 and filter chamber S2 in its inner circumferential surface.

As described above, base portion 91a and flange portion 91b of base body 91 are constructed to have a large thickness so as not to deform with increase in internal pressure in combustion chamber S1 even at the time of activation, and they are formed from a member made of a metal such as stainless steel, iron steel, an aluminum alloy, or a stainless alloy. An outer circumferential surface of flange portion 91b of base body 91 preferably abuts on the inner circumferential surface of housing main body 10.

Closing body 92 includes a closing portion 92a which closes communication hole 91a1 provided in base portion 91a of base body 91 and an annular cover portion 92b which covers an outer circumferential surface of base portion 91a, and cover portion 92b is erected to extend continuously from an outer circumferential edge of closing portion 92a. Closing body 92 is in a shape of a cup and laid over base body 91 so as to cover an opening end and the outer circumferential surface of base body 91 on the side of combustion chamber S1. An outer main surface of closing portion 92a abuts on an outer main surface of separation wall member 50.

As described above, closing body 92 is constructed to have a small thickness, and in particular, closing portion 92a of closing body 92 is constructed to relatively be weak so as to burst or melt with burning of gas generating agent 70 at the time of activation. It is formed from a press-formed product made of a metal such as copper, aluminum, a copper alloy, an aluminum alloy, or the like, or a resin molding formed by injection molding or sheet forming.

Sealing material 93 is interposed between housing main body 10 and closing body 92, and more specifically, arranged in the radial direction of housing main body 10 such that a part thereof is located between a swaging portion 14 provided in housing main body 10 which will be described later and cover portion 92b of closing body 92.

For example, an O ring composed of various types of rubber can be employed as sealing material 93, and in addition, a product obtained by applying a liquid sealant such as a silicone resin in advance to closing body 92 or housing main body 10 and curing the same may be employed as sealing material 93.

Housing main body 10 at a position corresponding to partition member 90 is provided with swaging portion 14 described above. Swaging portion 14 is formed by fixing by swaging called omnidirectional swaging in which housing main body 10 is substantially uniformly decreased in diameter radially inward and located along the circumferential direction of housing main body 10.

Referring to FIGS. 5 and 7, by providing swaging portion 14, partition member 90 is fixed by swaging portion 14 provided in housing main body 10. Accordingly, filter 80 is fixed to housing main body 10 by being held by closing member 30 and partition member 90 in the axial direction of housing main body 10.

More strictly, flange portion 91b of base body 91 and an outer edge portion of sealing material 93 are located between filter 80 and swaging portion 14. Therefore, by providing swaging portion 14, flange portion 91b of base body 91 and the outer edge portion of sealing material 93 are pressed against filter 80, and filter 80 is pressed against closing member 30 by partition member 90. Therefore, swaging portion 14 fixes filter 80 and partition member 90 integrally to housing main body 10.

Therefore, by adopting the construction, not only partition member 90 can readily be fixed to housing main body 10 but also filter 80 can simultaneously readily be fixed to housing main body 10.

By providing swaging portion 14 in housing main body 10, sealing material 93 is held between swaging portion 14 and cover portion 92b of closing body 92 in the radial direction of housing main body 10. More strictly, an inner edge portion of sealing material 93 located on an inner side of swaging portion 14 is compressed by being held by swaging portion 14 and cover portion 92b. Sealing material 93 thus comes in intimate contact with both of swaging portion 14 and cover portion 92b.

Since no gap is provided between housing main body 10 and closing body 92, airtightness between combustion chamber S1 and filter chamber S2 in that portion is ensured, and consequently combustion chamber S1 is hermetically sealed from the outside in that portion. Since communication hole 91a1 provided in base body 91 of partition member 90 is covered with closing portion 92a of closing body 92, combustion chamber S1 and filter chamber S2 do not communicate with each other in that portion while the gas generator is not active.

Additionally, as described above, the outer edge portion of sealing material 93 is in intimate contact with both of swaging portion 14 and flange portion 91b by being held by swaging portion 14 and flange portion 91b of base body 91 in the axial direction of housing main body 10. Therefore, sealability can be ensured also in this portion, and consequently sealability at a boundary portion between partition member 90 and housing main body 10 can be enhanced.

As shown in FIGS. 5 and 6, in cylinder type gas generator 1B in the present embodiment, only a single annular groove portion 22 is provided in the outer circumferential surface of holder 20 and a single swaging portion 12 is provided in housing main body 10 at a position corresponding to annular groove portion 22. Holder 20 is thus fixed by swaging to housing main body 10. Fixing by swaging is again omnidirectional swaging described above.

Annular sealing material 25 formed from an elastic body is interposed between annular groove portion 22 provided in the outer circumferential surface of holder 20 and swaging portion 12 provided in housing main body 10. Sealing material 25 is a member for preventing a gap from being provided between holder 20 and housing main body 10 by being held by annular groove portion 22 and swaging portion 12.

Sealing material 25 is thus in intimate contact with annular groove portion 22 and swaging portion 12 so that a space in the housing is hermetically sealed from the outside in that portion. For example, an O ring composed of various types of rubber can be employed as sealing material 25, and in addition, a product obtained by applying a liquid sealant such as a silicone resin in advance to annular groove portion 22 or housing main body 10 and curing the same may be employed as sealing material 25.

Accordingly, in cylinder type gas generator 1B in the present embodiment, unlike cylinder type gas generator 1A in the first embodiment described above, the end portion of increased diameter portion 61b1 in cylindrical portion 61b is not interposed between housing main body 10 and holder 20 but arranged at a position on the inner side of combustion chamber S1 at a distance from holder 20. The outer circumferential surface of increased diameter portion 61b1 abuts on the inner circumferential surface of housing main body 10 as in the first embodiment described above.

According to such a construction as well, referring to FIGS. 5 to 7, cylindrical heat insulating layer S1B is provided between accommodation chamber defining member 60 where gas generating agent 70 is accommodated and housing main body 10. Therefore, even in case of fire in a vehicle, increase in temperature of gas generating agent 70 due to external heating can effectively be suppressed.

Autoignition agent 71 is in thermal contact with housing main body 10 substantially through a shortest path with division member 72 which is a member made of a metal, the end portion of container body 61 close to bottom portion 61a as accommodation chamber defining member 60 which is a member made of a metal, and separation wall member 50 which is a member made of a metal being interposed, and is in thermal contact with housing main body 10 with separation wall member 50 which is a member made of a metal and partition member 90 being interposed. Therefore, autoignition agent 71 is efficiently heated in case of fire.

Therefore, with cylinder type gas generator 1B in the present embodiment as well, a cylinder type gas generator reduced in size and weight and improved in safety as compared with a conventional example can be obtained.

Third Embodiment

Figure 8:
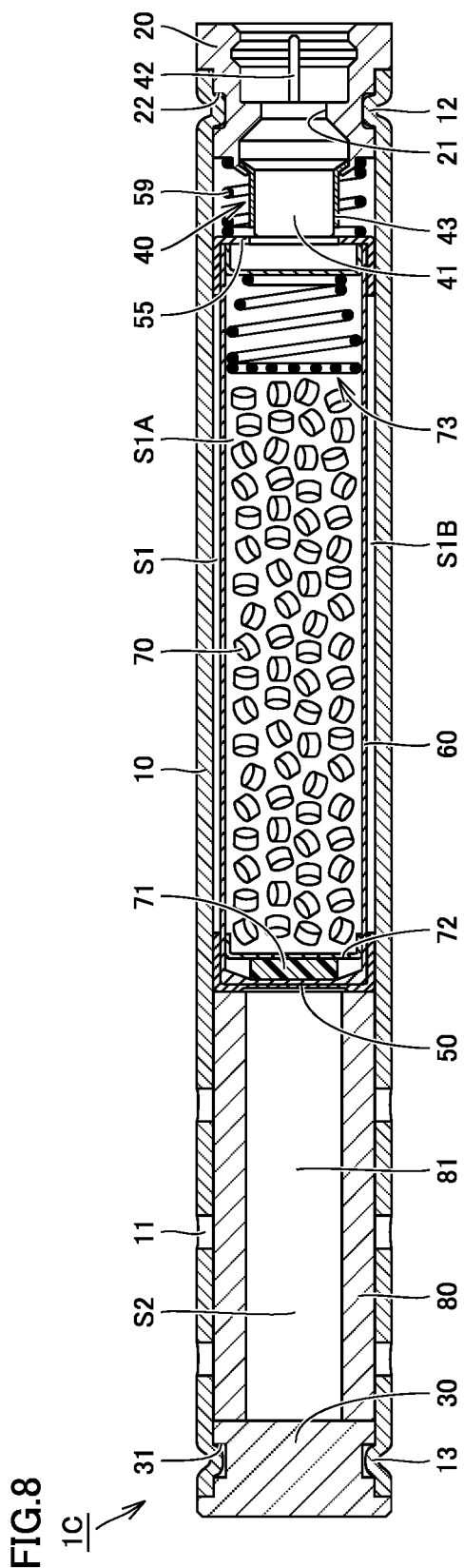
FIG. 8 is a schematic diagram of a cylinder type gas generator in a third embodiment of the present invention.
Figure 9:
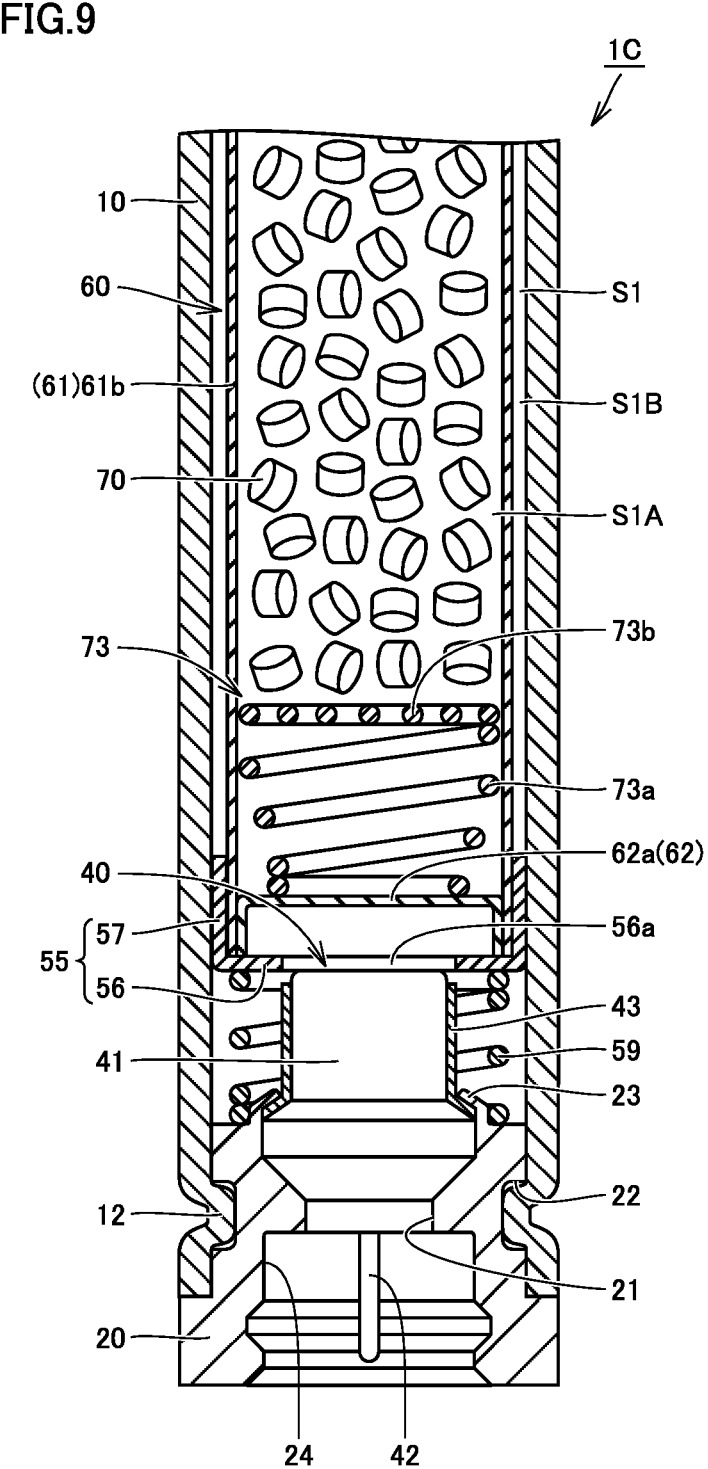
FIG. 9 is an enlarged cross-sectional view of a portion in the vicinity of the igniter of the cylinder type gas generator shown in FIG. 8.

FIG. 8 is a schematic diagram of a cylinder type gas generator in a third embodiment of the present invention. FIG. 9 is an enlarged cross-sectional view of a portion in the vicinity of an igniter of the cylinder type gas generator shown in FIG. 8. A cylinder type gas generator 1C in the present embodiment will be described below with reference to FIGS. 8 and 9.

As shown in FIGS. 8 and 9, cylinder type gas generator 1C in the present embodiment is similar in cylinder type gas generator 1A in the first embodiment described above in that a sealing material such as an O ring is not provided at any portion on the housing so as to hermetically seal combustion chamber S1 itself from the outside, whereas it is different from cylinder type gas generator 1A in the first embodiment described above in that only accommodation chamber defining member 60 provided in combustion chamber S1 independently and hermetically seals gas generating agent accommodation chamber S1A from the outside. Cylinder type gas generator 1C in the present embodiment also is different from what is called a dual-wall cylinder type gas generator in which a cylindrical body provided with holes in a circumferential wall is coaxially laid over a housing in that no hole is provided in cylindrical portion 61b of accommodation chamber defining member 60.

Cylinder type gas generator 1C in the present embodiment is different from cylinder type gas generator 1A in the first embodiment described above mainly in construction of accommodation chamber defining member 60, a structure for assembly of holder 20 to housing main body 10, and a structure for assembly of the end portion of accommodation chamber defining member 60 on the side of holder 20 to the housing.

Specifically, in cylinder type gas generator 1C in the present embodiment, accommodation chamber defining member 60 is implemented by a gastight container accommodating gas generating agent 70, autoignition agent 71, division member 72, and coil spring 73. More specifically, accommodation chamber defining member 60 includes bottom portion 61a (see FIG. 3) in a form of a flat plate arranged as being orthogonal to the axial direction of housing main body 10, cylindrical portion 61b (see FIG. 9) erected from the outer edge portion of bottom portion 61a, and a lid portion 62a (see FIG. 9) which closes an end portion opposite to a side where bottom portion 61a of cylindrical portion 61b is located (that is, the end portion of cylindrical portion 61b on the side of igniter 40).

Accommodation chamber defining member 60 is formed of two members of container body 61 which is a cup-shaped member which integrally implements bottom portion 61a and cylindrical portion 61b and a lid body 62 which is a member substantially in a form of a flat plate implementing lid portion 62a, and it is implemented as the gastight container by combining and joining these two members with each other. A space in accommodation chamber defining member 60 is thus hermetically sealed from a space outside accommodation chamber defining member 60. Brazing, adhesion, welding, and tightening by winding (swaging) are suitably used for joining the two members with each other. Airtightness is also further enhanced by separately using a sealant in joining them.

In the space in accommodation chamber defining member 60, gas generating agent 70, autoignition agent 71, division member 72, and coil spring 73 are accommodated as described above, and coil spring 73 among them is arranged in the space in accommodation chamber defining member 60 such that one end of spring portion 73a abuts on lid portion 62a of accommodation chamber defining member 60.

A guide body 55 as a guide member and a coil spring 59 which is a component different from coil spring 73 described above are arranged in the space in the housing located on the side of holder 20 relative to accommodation chamber defining member 60.

Guide body 55 is in a shape of a cylinder with bottom, and formed from a member made of a metal such as stainless steel, iron steel, an aluminum alloy, or a stainless alloy. Guide body 55 includes a bottom wall portion 56 in a form of a flat plate arranged as being orthogonal to the axial direction of housing main body 10 and an annular wall portion 57 in a form of a cylindrical wall erected from an outer edge portion of bottom wall portion 56. Guide body 55 includes an opening 56a in bottom wall portion 56, and an outer circumferential surface of annular wall portion 57 of guide body 55 abuts on the inner circumferential surface of housing main body 10. Opening 56a provided in bottom wall portion 56 is provided as being opposed to ignition portion 41 of igniter 40.

The axial end portion of accommodation chamber defining member 60 on a side where lid portion 62a is located is inserted in the opening end of guide body 55, and the end portion of cylindrical portion 61b located on the side of lid portion 62a abuts on annular wall portion 57 of guide body 55.

Thus, in the present embodiment, accommodation chamber defining member 60 is held by separation wall member 50 inserted in housing main body 10 and guide body 55 at the opposing end portions in the axial direction, so that most part of cylindrical portion 61b of accommodation chamber defining member 60 in the portion defining gas generating agent accommodation chamber S1A where gas generating agent 70 is accommodated is arranged at a prescribed distance from the inner circumferential surface of housing main body 10. Therefore, heat insulating layer S1B is provided along the axial direction of combustion chamber S1 also in cylinder type gas generator 1C in the present embodiment.

Coil spring 59 described above is a member which accommodates variation in dimension of various components accommodated in the housing. Unlike coil spring 73 described above, coil spring 59 is implemented by a general spring member not including pressing portion 73b as included in coil spring 73.

Coil spring 59 is arranged such that one end thereof abuts on holder 20 and the other end abuts on bottom wall portion 56 of guide body 55. Thus, guide body 55 is elastically biased toward filter 80 by coil spring 59, so that guide body 55, accommodation chamber defining member 60, and separation wall member 50 are accordingly held between filter 80 and coil spring 59.

In cylinder type gas generator 1C in the present embodiment, gas generating agent 70 and autoignition agent 71 are hermetically sealed by accommodation chamber defining member 60 formed as the gastight container as described above. Therefore, no special sealing structure is provided at a boundary portion between housing main body 10 and holder 20 assembled thereto and a boundary portion between holder 20 and igniter 40 assembled thereto.

In cylinder type gas generator 1C in the present embodiment, as in cylinder type gas generator 1B in the second embodiment described above, only a single annular groove portion 22 is provided in the outer circumferential surface of holder 20 and a single swaging portion 12 is provided in housing main body 10 at a position corresponding to annular groove portion 22. Though holder 20 is thus fixed by swaging to housing main body 10, no sealing material is provided between swaging portion 12 and annular groove portion 22. No sealing material is provided either in a portion between holder 20 and igniter 40.

According to such a construction as well, as in the first embodiment described above, cylindrical heat insulating layer S1B is provided between accommodation chamber defining member 60 where gas generating agent 70 is accommodated and housing main body 10, so that an effect the same as the effect described in the first embodiment above is obtained. Cylinder type gas generator 1C reduced in size and weight and improved in safety as compared with a conventional example can be obtained.

Fourth Embodiment

Figure 10:
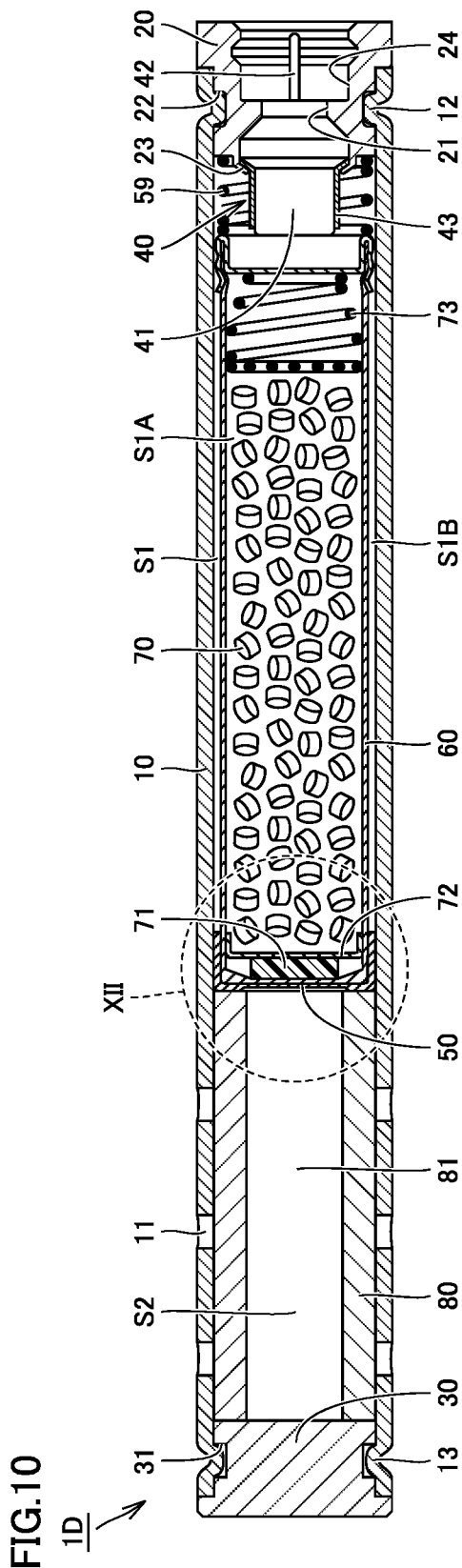
FIG. 10 is a schematic diagram of a cylinder type gas generator in a fourth embodiment of the present invention.
Figure 11:
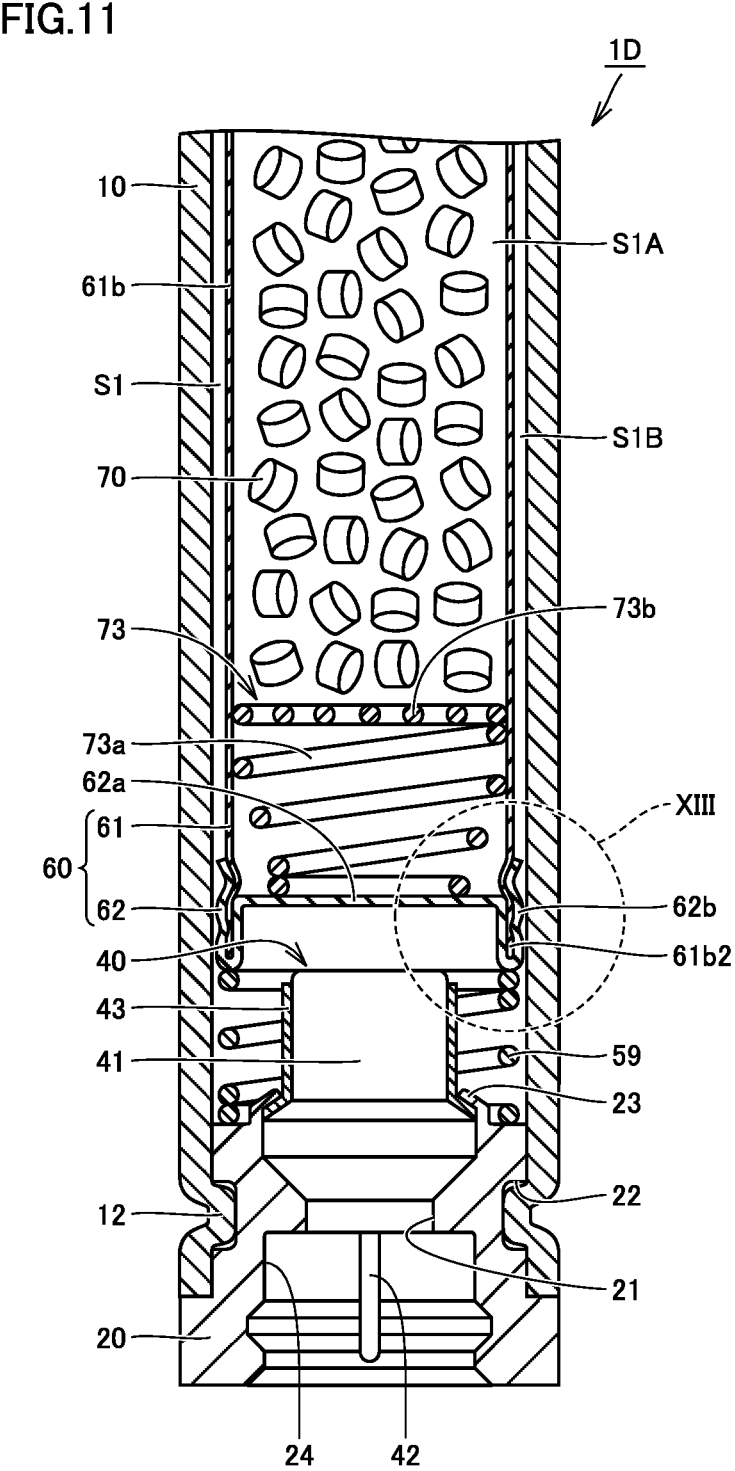
FIG. 11 is an enlarged cross-sectional view of a portion in the vicinity of the igniter of the cylinder type gas generator shown in FIG. 10.
Figure 12:
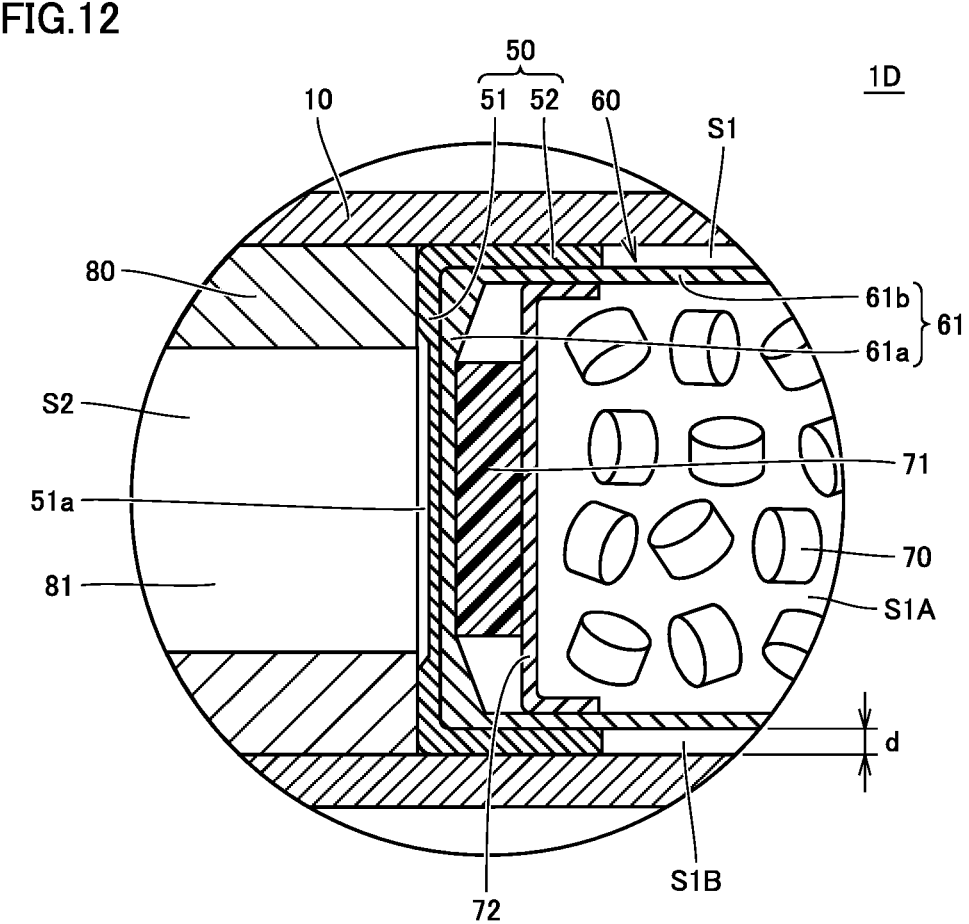
FIG. 12 is an enlarged cross-sectional view of a portion in the vicinity of the partition portion of the cylinder type gas generator shown in FIG. 10.

FIG. 10 is a schematic diagram of a cylinder type gas generator in a fourth embodiment of the present invention. FIGS. 11 and 12 are an enlarged cross-sectional view of a portion in the vicinity of the igniter and an enlarged cross-sectional view of a portion in the vicinity of the partition portion, of the cylinder type gas generator shown in FIG. 10. FIG. 12 corresponds to a region XII shown in FIG. 10. A construction of a cylinder type gas generator 1D in the present embodiment will be described below with reference to FIGS. 10 to 12.

As shown in FIGS. 10 and 11, in cylinder type gas generator 1D in the present embodiment, similarly to cylinder type gas generator 1C in the third embodiment described above, gas generating agent accommodation chamber S1A is independently and hermetically sealed from the outside only by accommodation chamber defining member 60 provided in combustion chamber S1, whereas cylinder type gas generator 1D is different from cylinder type gas generator 1C in the third embodiment described above in specific construction of accommodation chamber defining member 60 and an assembly structure thereof. Cylinder type gas generator 1D in the present embodiment also is different from what is called a dual-wall cylinder type gas generator in which a cylindrical body provided with holes in a circumferential wall is coaxially laid over a housing in that no hole is provided in cylindrical portion 61b of accommodation chamber defining member 60.

As shown in FIG. 10, cylinder type gas generator 1D in the present embodiment has an elongated columnar outer geometry and has an elongated cylindrical housing having closed one and the other end portions located in the axial direction. The housing includes housing main body 10, holder 20, and closing member 30.

Igniter 40, separation wall member 50, coil spring 59, accommodation chamber defining member 60, gas generating agent 70, autoignition agent 71, division member 72, coil spring 73, and filter 80 as internal components are accommodated in the housing constituted of housing main body 10, holder 20, and closing member 30. In the housing, combustion chamber S1 where gas generating agent 70 among the internal components described above is mainly arranged and filter chamber S2 where filter 80 is arranged are located.

Housing main body 10 is formed from an elongated cylindrical member which implements a circumferential wall portion of the housing and has an opening provided at each of opposing ends in the axial direction. Holder 20 is fixed to housing main body 10 so as to close one axial opening end of housing main body 10. Closing member 30 is fixed to housing main body 10 so as to close the other axial opening end of housing main body 10. Omnidirectional swaging described above is used for fixing holder 20 and closing member 30 to housing main body 10.

As shown in FIGS. 10 and 11, igniter 40 is assembled to above-described one axial end portion of the housing by being supported by holder 20. Combustion control cover 43 is externally attached to ignition portion 41 of igniter 40. Fixing by swaging by swaging portion 23 provided in holder 20 is used for fixing igniter 40 and combustion control cover 43 to holder 20.

As shown in FIGS. 10 and 12, separation wall member 50 as a partition portion is arranged at a prescribed position in the space in the housing. Separation wall member 50 is in a shape of a cylinder with bottom, and it is a member which serves to partition the space in the housing into combustion chamber S1 and filter chamber S2 in the axial direction.

Separation wall member 50 includes separation wall portion 51 in a form of a flat plate arranged as being orthogonal to the axial direction of housing main body 10 and annular wall portion 52 in a form of a cylindrical wall erected from the circumferential edge of separation wall portion 51. Separation wall member 50 is arranged such that the outer main surface of separation wall portion 51 abuts on filter 80 and the outer circumferential surface of annular wall portion 52 abuts on the inner circumferential surface of housing main body 10.

Score 51a is provided in the main surface of separation wall portion 51 which abuts on filter 80. Score 51a serves to provide an opening as a result of cleavage of separation wall portion 51 with increase in internal pressure in combustion chamber S1 as a result of burning of gas generating agent 70, and it is provided, for example, as a plurality of grooves provided to radially intersect with one another. Score 51a is provided in a portion in filter 80 opposed to hollow portion 81.

As shown in FIGS. 10 to 12, in the space in the housing, coil spring 59 and accommodation chamber defining member 60 are arranged in a space (that is, combustion chamber S1) lying between holder 20 and separation wall member 50. Gas generating agent 70, autoignition agent 71, division member 72, and coil spring 73 are accommodated in gas generating agent accommodation chamber S1A which is the space in accommodation chamber defining member 60.

Accommodation chamber defining member 60 serves to seal gas generating agent 70 accommodated therein, and it is formed from a weak member which melts or bursts with heat or a pressure generated by activation of igniter 40. Accommodation chamber defining member 60 is in a substantially cylindrical shape having opposing ends closed and arranged substantially coaxially with the housing.

More specifically, accommodation chamber defining member 60 is implemented as a gastight container including container body 61 and lid body 62, and gas generating agent accommodation chamber S1A described above is provided in accommodation chamber defining member 60 by joining container body 61 and lid body 62 with each other.

Container body 61 includes bottom portion 61a in a form of a flat plate and cylindrical portion 61b extending from the circumferential edge of bottom portion 61a. Lid body 62 includes lid portion 62a in a form of a flat plate located in container body 61 by being inserted into an opening end 61b2 of container body 61 and a fold-over portion 62b which extends from a circumferential edge of lid portion 62a and partly curved to cover an inner circumferential surface, an end surface, and an outer circumferential surface of opening end 61b2 of container body 61. Gas generating agent accommodation chamber S1A described above is mainly defined by bottom portion 61a and cylindrical portion 61b of container body 61 and lid portion 62a of lid body 62.

Fold-over portion 62b provided to cover opening end 61b2 of container body 61 is provided with a first swaging portion 62b1 and a second swaging portion 62b2 (see FIG. 13) so that lid body 62 is fixed to container body 61. Details of a construction of a joint portion implemented by opening end 61b2 and fold-over portion 62b will be described later.

Accommodation chamber defining member 60 is inserted in housing main body 10 such that bottom portion 61a of container body 61 is located on the side of separation wall member 50 and lid portion 62a of lid body 62 is located on the side of holder 20. Lid portion 62a of lid body 62 thus faces ignition portion 41 of igniter 40.

More specifically, the end portion of accommodation chamber defining member 60 on the side where bottom portion 61a is located is fitted into separation wall member 50 by being inserted in separation wall member 50 and the end portion of accommodation chamber defining member 60 on the side where lid portion 62a is located is loosely fitted into housing main body 10. Accommodation chamber defining member 60 is thus fixed as being positioned with respect to housing main body 10 and arranged at a prescribed distance from the inner circumferential surface of housing main body 10.

Therefore, heat insulating layer S1B which is a space of a prescribed size is provided between housing main body 10 implementing the circumferential wall portion of the housing and cylindrical portion 61b of accommodation chamber defining member 60, and heat insulating layer S1B extends substantially cylindrically along the axial direction of combustion chamber S1.

In gas generating agent accommodation chamber S1A provided in accommodation chamber defining member 60, at the end portion on the side of separation wall member 50, autoignition agent 71 and division member 72 are arranged, and at the end portion on the side of holder 20, coil spring 73 is arranged. In gas generating agent accommodation chamber S1A provided in accommodation chamber defining member 60, gas generating agent 70 is arranged in a portion except for the end portion on the side of separation wall member 50 and the end portion on the side of holder 20.

Division member 72 is a member for dividing gas generating agent accommodation chamber S1A in the axial direction, and formed from a relatively weak member so as to burst or melt with burning of gas generating agent 70 at the time of activation. Division member 72 is located as being in contact with both of gas generating agent 70 and autoignition agent 71 and lying therebetween. The outer circumferential surface of division member 72 preferably abuts on cylindrical portion 61b of accommodation chamber defining member 60.

Autoignition agent 71 is an agent which self-ignites without depending on activation of igniter 40, and arranged to abut on bottom portion 61a of accommodation chamber defining member 60. Autoignition agent 71 is an agent lower in spontaneous combustion temperature than gas generating agent 70, and it serves not to induce an abnormal operation due to external heating of cylinder type gas generator 1D in case of fire in a vehicle equipped with an air bag apparatus incorporating cylinder type gas generator 1D.

Coil spring 73 is provided for the purpose of preventing gas generating agent 70 made of a molding from being crushed by vibration or the like. Coil spring 73 is arranged such that one end of spring portion 73a abuts on lid portion 62a of accommodation chamber defining member 60 and pressing portion 73b is formed at the other end of spring portion 73a. Gas generating agent 70 is thus elastically biased by coil spring 73 toward separation wall member 50 and prevented from moving in accommodation chamber defining member 60.

In a space in combustion chamber S1 located on the side of holder 20 relative to accommodation chamber defining member 60, coil spring 59 as an elastic body which is a component different from coil spring 73 described above is arranged. Coil spring 59 is a member which accommodates variation in dimension of various components accommodated in the housing. Unlike coil spring 73 described above, coil spring 59 is implemented by a general spring member not including pressing portion 73b as included in coil spring 73.

More specifically, coil spring 59 is arranged such that one end thereof abuts on holder 20 and the other end abuts on a tip end of fold-over portion 62b located at the end portion of accommodation chamber defining member 60 on the side of holder 20. Thus, accommodation chamber defining member 60 is elastically biased toward separation wall member 50 by coil spring 59 and fixed to the housing by being held between separation wall member 50 described above and coil spring 59.

As shown in FIG. 10, filter 80 is arranged in a space (that is, filter chamber S2) lying between closing member 30 and separation wall member 50 in the space in the housing. Filter 80 is formed from a cylindrical member having hollow portion 81 extending in a direction the same as the axial direction of housing main body 10, and has axial one end surface abutting on closing member 30 and axial the other end surface abutting on separation wall member 50.

A plurality of gas discharge openings 11 are provided along the circumferential direction and the axial direction in housing main body 10 in a portion defining filter chamber S2. The plurality of gas discharge openings 11 serve for guiding gas which has passed through filter 80 to the outside of the housing.

An operation of cylinder type gas generator 1D in the present embodiment when it is activated will now be described with reference to FIG. 10.

Referring to FIG. 10, when a vehicle on which cylinder type gas generator 1D in the present embodiment is mounted collides, collision is sensed by collision sensing means separately provided in the vehicle and igniter 40 is activated based thereon by current feed caused by a control unit separately provided in the vehicle.

When igniter 40 is activated, an ignition agent or an enhancer agent in addition thereto burns. Then, a pressure in ignition portion 41 increases, which bursts ignition portion 41, and thermal particles flow to the outside of ignition portion 41.

The thermal particles which flow out of ignition portion 41 are given directivity by combustion control cover 43 described above so as to reach lid portion 62a of accommodation chamber defining member 60. Lid portion 62a of accommodation chamber defining member 60 melts or bursts with heat or a pressure generated by activation of igniter 40, and the thermal particles described above reach gas generating agent 70.

The thermal particles which have reached gas generating agent 70 burn gas generating agent 70 so that a large amount of gas is produced. Accordingly, a pressure and a temperature in gas generating agent accommodation chamber S1A increase and cylindrical portion 61b of accommodation chamber defining member 60 and division member 72 burst or melt, autoignition agent 71 burns, and furthermore, bottom portion 61a of accommodation chamber defining member 60 bursts or melts.

As gas generating agent 70 burns, a pressure in the entire combustion chamber S1 further increases and an internal pressure in combustion chamber S1 reaches a prescribed pressure. Thus, a portion of separation wall member 50 where score 51a is provided ruptures. Thus, a communication hole is provided in separation wall member 50 in the portion opposed to hollow portion 81 of filter 80, and combustion chamber S1 and filter chamber S2 communicate with each other through the communication hole.

Accordingly, the gas generated in combustion chamber S1 flows into filter chamber S2 through the communication hole provided in separation wall member 50. The gas which has flowed into filter chamber S2 flows along the axial direction through hollow portion 81 of filter 80, thereafter changes its direction toward the radial direction, and passes through filter 80. At that time, heat is removed through filter 80 and the gas is cooled, and slag contained in the gas is removed by filter 80.

The gas which has passed through filter 80 is discharged to the outside of the housing through gas discharge opening 11. The discharged gas is introduced into an air bag provided adjacently to cylinder type gas generator 1D to thereby expand and develop the air bag.

Figure 13:
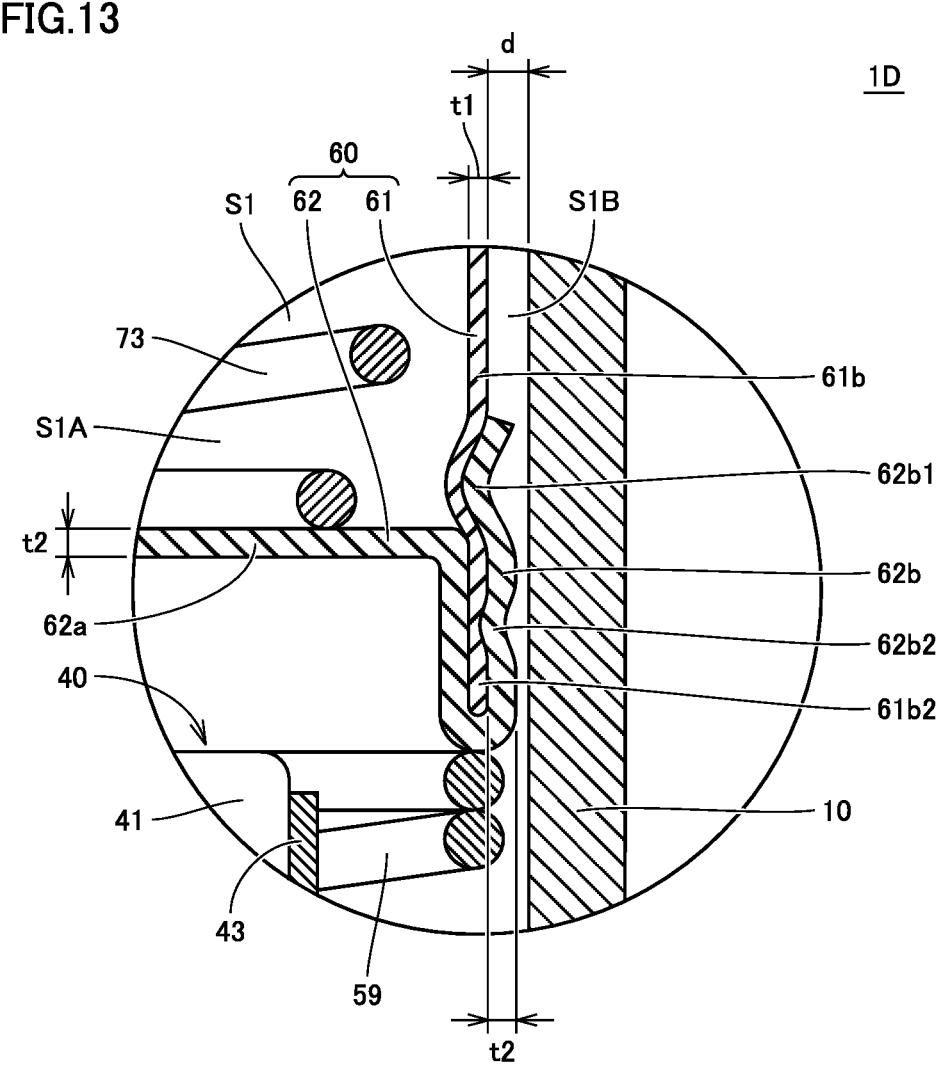
FIG. 13 is an enlarged view of a region XIII shown in FIG. 11.

FIG. 13 is an enlarged view of a region XIII shown in FIG. 12. The construction of the joint portion of accommodation chamber defining member 60 of cylinder type gas generator 1D described above will now be described in detail with reference to FIG. 13.

In general, in an example in which the gas generating agent is sealed in a gastight container which melts or bursts with heat or a pressure generated by activation of the igniter in order to prevent the gas generating agent from absorbing moisture, the gastight container should be constituted of a container body and a lid body each formed from a relatively weak member. In that case, when the container body and the lid body are joined with each other simply with brazing, adhesion, welding, and tightening by winding without any devisal, strength of the joint portion is not sufficiently high and the gastight container is highly likely to break due to application of external force to the joint portion in assembly. Therefore, sealing performance may consequently lower.

In this connection, cylinder type gas generator 1D in the present embodiment improve this aspect by adopting a construction of the joint portion of accommodation chamber defining member 60 as the gastight container as described below.

As described above, in cylinder type gas generator 1D in the present embodiment, accommodation chamber defining member 60 is constituted of container body 61 and lid body 62, and opening end 61b2 of container body 61 is covered with fold-over portion 62b of lid body 62. Therefore, the joint portion is implemented by opening end 61b2 and fold-over portion 62b (see FIG. 11).

Container body 61 and lid body 62 are each formed from a weak member which melts or bursts with heat or a pressure generated by activation of igniter 40. More specifically, lid body 62 is formed from a weak member which melts or bursts with heat or a pressure generated by burning of an ignition agent or an enhancer agent in addition thereto in response to activation of igniter 40, and container body 61 is formed from a weak member which melts or bursts with heat or a pressure generated by burning of gas generating agent 70 brought about by activation of igniter 40.

Specifically, container body 61 and lid body 62 are each preferably formed from a press-formed product made of a metal such as copper, aluminum, a copper alloy, an aluminum alloy, or the like, and they are joined to each other at the joint portion described above so that gas generating agent 70 accommodated therein is hermetically sealed from the outside.

As shown in FIG. 13, fold-over portion 62b in a portion erected from lid portion 62a of lid body 62 is located as abutting on the inner circumferential surface of opening end 61b2 of container body 61 and a fold-back portion curved to cover the end surface of opening end 61b2 of container body 61 is provided at a tip end of fold-over portion 62b in that portion. Fold-over portion 62b in a portion extending from the fold-back portion is located as abutting on the outer circumferential surface of opening end 61b2 of container body 61, and the tip end of fold-over portion 62b in that portion reaches cylindrical portion 61b of container body 61 in the portion defining gas generating agent accommodation chamber S1A.

In a portion of fold-over portion 62b which covers the outer circumferential surface of opening end 61b2 of container body 61 and corresponds to cylindrical portion 61b of container body 61 in the portion defining gas generating agent accommodation chamber S1A at a position adjacent to lid portion 62a of lid body 62, first swaging portion 62b1 formed by decreasing a diameter of fold-over portion 62b radially inward is located.

In a portion of fold-over portion 62b which covers the outer circumferential surface of opening end 61b2 of container body 61 and opposed to a portion of fold-over portion 62b which covers the inner circumferential surface of opening end 61b2, second swaging portion 62b2 formed by decreasing a diameter of fold-over portion 62b radially inward is located.

By thus fixing by swaging fold-over portion 62b of lid body 62 at two positions, strength of joint of lid body 62 to container body 61 is enhanced and performance of sealing of gas generating agent 70 by accommodation chamber defining member 60 can significantly be enhanced with a simplified construction. Therefore, in assembly of accommodation chamber defining member 60 to housing main body 10, the joint portion can be prevented from breaking to such an extent as impairing hermetic sealing of gas generating agent 70 even when external force is applied to the joint portion implemented by opening end 61b2 of container body 61 and fold-over portion 62b of lid body 62.

In particular, in cylinder type gas generator 1D in the present embodiment, after assembly of accommodation chamber defining member 60 to housing main body 10, one end portion of coil spring 59 is arranged to abut on the tip end of fold-over portion 62b of accommodation chamber defining member 60 (that is, the above-described curved portion of fold-over portion 62b) as described above. In that case as well, break of the joint portion to such an extent as impairing hermetic sealing of gas generating agent 70 can be suppressed.

In cylinder type gas generator 1D in the present embodiment, thicknesses t1 and t2 satisfy a condition of t1<t2 where t1 represents a thickness of a portion defining cylindrical portion 61b of container body 61 and t2 represents a thickness of a portion implementing fold-over portion 62b of lid body 62. Thickness t2 of the portion implementing fold-over portion 62b of lid body 62 is greater than thickness t1 of the portion implementing cylindrical portion 61b of container body 61.

More specifically, thickness t1 of the portion implementing cylindrical portion 61b of container body 61 is set to relatively be small such that the portion reliably melts or bursts with heat or a pressure generated by burning of gas generating agent 70, and it is preferably set, for example, to a thickness not smaller than 0.15 mm and not greater than 0.25 mm. In the present embodiment, thickness t1 is set to 0.20 mm.

Thickness t2 of the portion implementing fold-over portion 62b of lid body 62 is set to relatively be large in consideration of the fact that heat or a pressure generated by burning of an ignition agent or an enhancer agent in addition thereto is directly applied to lid body 62 and lid body 62 relatively easily melts or bursts with the heat or the pressure. On condition that thickness t2 is greater than thickness t1, thickness t2 is preferably set, for example, to a thickness not smaller than 0.25 mm and not greater than 0.35 mm. In the present embodiment, thickness t2 is set to 0.30 mm.

Thus, thickness t2 of the portion implementing fold-over portion 62b of lid body 62 to which the heat or the pressure generated by activation of igniter 40 is directly applied is set to be greater than thickness t1 of the portion implementing cylindrical portion 61b of container body 61 to which heat or a pressure generated by activation of igniter 40 is not directly applied but heat or a pressure generated by burning of gas generating agent 70 brought about by activation of igniter 40 is applied, so that rigidity of the joint portion constituted by opening end 61b2 of container body 61 and fold-over portion 62b of lid body 62 can be enhanced while a reliable operation by cylinder type gas generator 1D is ensured.

Therefore, by adopting such a construction, rigidity of the joint portion is enhanced and strength of joint of lid body 62 to container body 61 is enhanced so that performance of sealing of gas generating agent 70 by accommodation chamber defining member 60 can significantly be enhanced with a simplified construction. Therefore, in assembly of accommodation chamber defining member 60 to housing main body 10, the joint portion can be prevented from breaking to such an extent as impairing hermetic sealing of gas generating agent 70 even when external force is applied to the joint portion implemented by opening end 61b2 of container body 61 and fold-over portion 62b of lid body 62.

In particular, in cylinder type gas generator 1D in the present embodiment, after assembly of accommodation chamber defining member 60 to housing main body 10, one end portion of coil spring 59 is arranged to abut on the tip end of fold-over portion 62b of accommodation chamber defining member 60 (that is, the above-described curved portion of fold-over portion 62b) as described above. In that case as well, break of the joint portion to such an extent as impairing hermetic sealing of gas generating agent 70 can be suppressed.

As described above, with cylinder type gas generator 1D in the present embodiment, in addition to the effect described in the first embodiment above (that is, the effect to obtain the cylinder type gas generator reduced in size and weight and improved in safety as compared with the conventional example), such an effect that performance of sealing of gas generating agent 70 by accommodation chamber defining member 60 can significantly be enhanced with a simplified construction and a cylinder type gas generator which can thus obtain desired gas output can be obtained is obtained.

As shown in FIGS. 10 to 13, in order to provide heat insulating layer S1B described above in the housing, accommodation chamber defining member 60 should be assembled as being positioned with respect to the housing such that cylindrical portion 61b of accommodation chamber defining member 60 is located at a prescribed distance (that is, a distance d shown in FIGS. 12 and 13) from the inner circumferential surface of housing main body 10.

In this connection, positioning above is made in the present embodiment such that the end portion of accommodation chamber defining member 60 on the side where bottom portion 61a is located is fitted into separation wall member 50 by being inserted in separation wall member 50 and the end portion of accommodation chamber defining member 60 on the side where lid portion 62a is located is loosely fitted into housing main body 10 as described above.

As shown in FIG. 12, by setting a thickness of annular wall portion 52 of separation wall member 50 to be equal to distance d, cylindrical portion 61b of accommodation chamber defining member 60 is located at distance d from the inner circumferential surface of housing main body 10 at the end portion of accommodation chamber defining member 60 on the side where bottom portion 61a is located and the vicinity thereof.

As shown in FIG. 13, the end portion of accommodation chamber defining member 60 on the side where lid portion 62a is located does not abut on the inner circumferential surface of housing main body 10, however, the end portion of accommodation chamber defining member 60 on the side where lid portion 62a is located is located as being closer to the inner circumferential surface of housing main body 10 by thickness t2 of fold-over portion 62b in its portion which covers the outer circumferential surface of opening end 61b2 of container body 61.

Therefore, only by loosely fitting the end portion of accommodation chamber defining member 60 in the portion including fold-over portion 62b into housing main body 10 as described above, cylindrical portion 61b of accommodation chamber defining member 60 can be arranged as being distant approximately by distance d from the inner circumferential surface of housing main body 10 in the vicinity of the end portion of accommodation chamber defining member 60 on the side where lid portion 62a is located.

By setting thickness t2 of the portion implementing fold-over portion 62b of lid body 62 to be greater than thickness t1 of the portion implementing cylindrical portion 61b of container body 61 as described above, a size of a gap (what is called a play) between the end portion of accommodation chamber defining member 60 in the portion including fold-over portion 62b and housing main body 10 is made smaller by thickness t2, so that a higher effect of positioning described above can be obtained.

As described above, by providing second swaging portion 62b2 in the portion of fold-over portion 62b which covers the outer circumferential surface of opening end 61b2 of container body 61 and opposed to the portion of fold-over portion 62b which covers the inner circumferential surface of opening end 61b2, fold-over portion 62b in a portion adjacent to second swaging portion 62b2 projects outward due to application of a pressure in fixing by swaging, although the extent thereof is minor. The size of the gap (what is called a play) described above is made smaller by that amount, and the higher effect of positioning described above can be obtained also in this aspect.

Therefore, by adopting the construction, without arranging a spacer member (for example, a member like guide body 55 in the third embodiment described above) like separation wall member 50 at the end portion of accommodation chamber defining member 60 on the side of igniter 40, heat insulating layer S1B of a prescribed size can reliably be provided in the housing and the number of components as well as a size and a weight of the cylinder type gas generator can be reduced.

Fifth Embodiment

Figure 14:
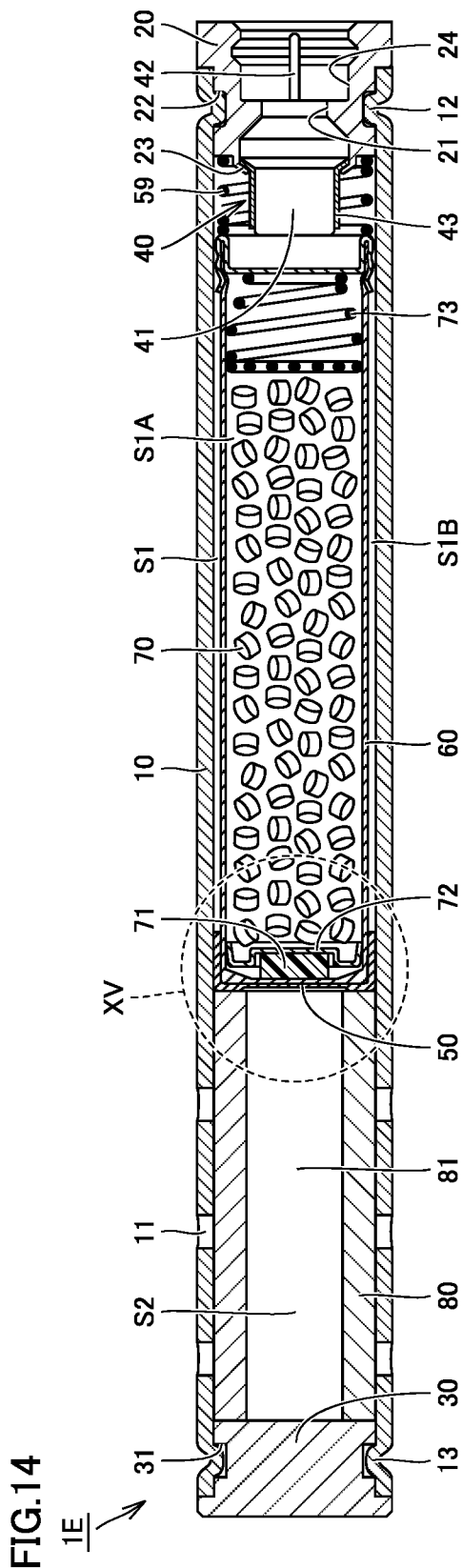
FIG. 14 is a schematic diagram of a cylinder type gas generator in a fifth embodiment of the present invention.
Figure 15:
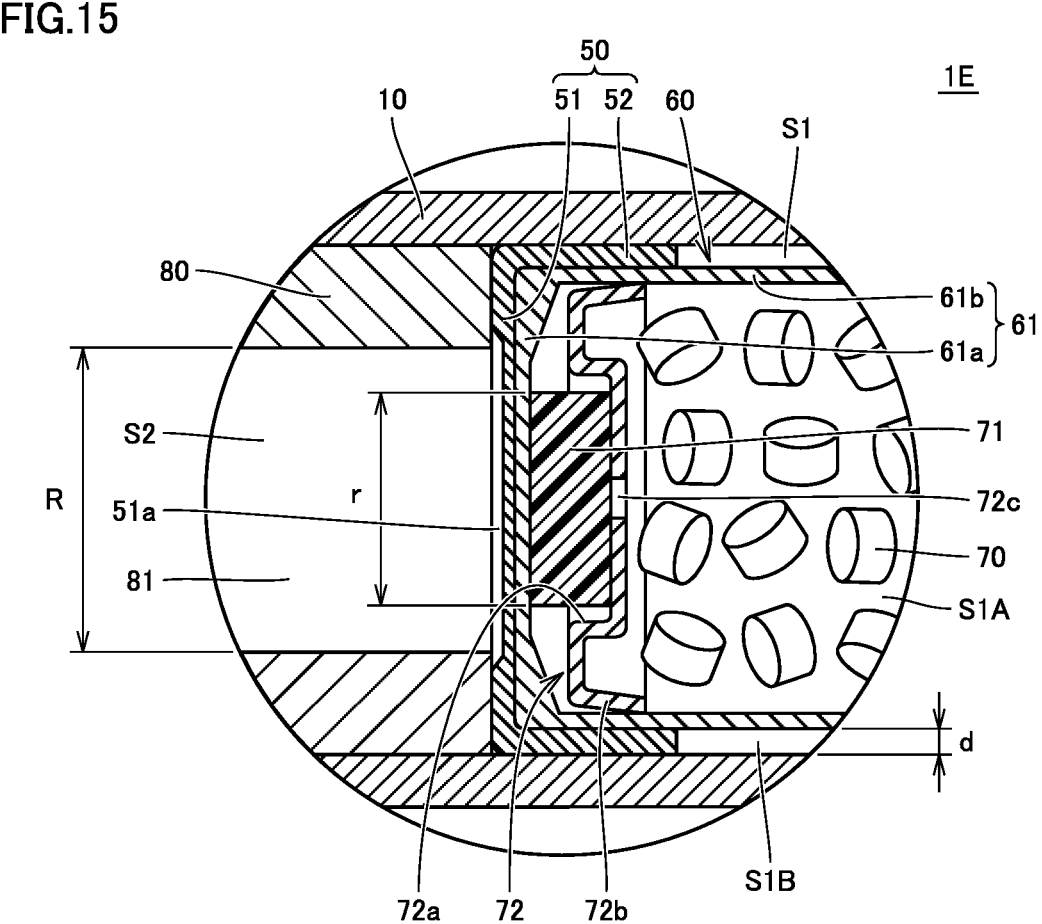
FIG. 15 is an enlarged cross-sectional view of a portion in the vicinity of the division member of the cylinder type gas generator shown in FIG. 14.

FIG. 14 is a schematic diagram of a cylinder type gas generator in a fifth embodiment of the present invention. FIG. 15 is an enlarged cross-sectional view of a portion in the vicinity of a division portion of the cylinder type gas generator shown in FIG. 14. FIG. 15 corresponds to a region XV shown in FIG. 14. A construction of a cylinder type gas generator 1E in the present embodiment will be described below with reference to FIGS. 14 and 15.

As shown in FIG. 14, cylinder type gas generator 1E in the present embodiment is substantially the same in construction as cylinder type gas generator 1D in the fourth embodiment described above and basically different only in shape of division member 72. Cylinder type gas generator 1E in the present embodiment is also different from what is called a dual-wall cylinder type gas generator in which a cylindrical body provided with holes in a circumferential wall is coaxially laid over a housing in that no hole is provided in cylindrical portion 61b of accommodation chamber defining member 60.

Specifically, as shown in FIG. 15, division member 72 includes a positioning recess 72a in a portion facing separation wall member 50 in the axial direction of the circumferential wall portion of housing main body 10 and includes a fixing cylinder portion 72b in a shape of a skirt on an outer edge. A bottom portion of positioning recess 72a of division member 72 is provided with a single through hole 72c or a plurality of through holes 72c for communication between a pair of spaces (that is, a space accommodating gas generating agent 70 and a space accommodating autoignition agent 71) divided by division member 72.

Division member 72 does not necessarily have to be provided with through hole 72c, and a through hole may be provided in division member 72 with burning of gas generating agent 70, by providing a weak portion (a small-thickness portion) such as a score in division member 72.

Division member 72 is preferably formed from a press-formed product made of a metal, and preferably formed, for example, from a member made of brass which does not rupture or melt even though gas generating agent 70 burns. Division member 72 does not necessarily have to be made of brass, and may be made of stainless steel, iron steel, iron, aluminum, or an aluminum alloy.

Division member 72 is inserted in cylindrical portion 61b of container body 61 in accommodation chamber defining member 60, and fixing cylinder portion 72b of division member 72 abuts on the inner circumferential surface of cylindrical portion 61b. Division member 72 is press-fitted into cylindrical portion 61b of container body 61 so as to fix division member 72 to accommodation chamber defining member 60.

Some of autoignition agent 71 is accommodated in positioning recess 72a provided in division member 72. An inner diameter of positioning recess 72a is preferably equal to or smaller than a diameter R of hollow portion 81 of filter 80 on the premise that it is greater than a diameter r of autoignition agent 71 in a form of a pellet (that is, a columnar shape of a flat profile).

Autoignition agent 71 lies between the bottom portion of positioning recess 72a of division member 72 and bottom portion 61a of container body 61. Autoignition agent 71 thus abuts on both of division member 72 and container body 61.

Therefore, autoignition agent 71 is in thermal contact with housing main body 10 substantially through a shortest path with division member 72 which is a member made of a metal, the end portion of container body 61 close to bottom portion 61a as accommodation chamber defining member 60 which is a member made of a metal, and separation wall member 50 which is a member made of a metal being interposed also in the present embodiment. Therefore, autoignition agent 71 is efficiently heated in case of fire in a vehicle equipped with an air bag apparatus incorporating cylinder type gas generator 1E.

Heat insulating layer S1B in a cylindrical shape is provided between accommodation chamber defining member 60 where gas generating agent 70 is accommodated and housing main body 10 also in the present embodiment. Thus, increase in temperature of gas generating agent 70 due to external heating even in case of fire can effectively be suppressed.

Therefore, with cylinder type gas generator 1E in the present embodiment as well, the effect of obtaining the cylinder type gas generator reduced in size and weight and improved in safety as compared with the conventional example is obtained, and such an effect that performance of sealing of gas generating agent 70 by accommodation chamber defining member 60 can significantly be enhanced with a simplified construction and thus a cylinder type gas generator capable of obtaining desired gas output can be obtained is obtained.

Examples of thicknesses of division member 72 and various components arranged around the same in cylinder type gas generator 1E in the present embodiment include a thickness of division member 72 of 0.15 [mm], a thickness of container body 61 of 0.2 [mm], a thickness of lid body 62 of 0.3 [mm], and a thickness of the circumferential wall portion of the housing main body of 1.5 [mm].

An advantageous effect of providing positioning recess 72a in division member 72 and accommodating some of autoignition agent 71 in positioning recess 72a as described above will be described in detail.

The autoignition agent ignites under a special condition such as fire in a vehicle as described previously, but normally it does not ignite. When the cylinder type gas generator is activated due to collision of a vehicle, the autoignition agent also burns with burning of the gas generating agent.

In this case, when the autoignition agent is arranged at the end portion of the combustion chamber on the side of the filter chamber, it is also expected that the container body and the separation wall member burst before the autoignition agent ignites with increase in pressure in the combustion chamber and that the autoignition agent is blown toward the filter chamber.

In that case, if such a phenomenon that the autoignition agent is caught at the end portion of the filter on the side of the combustion chamber occurs, the autoignition agent may block communication between the combustion chamber and the filter chamber and desired gas output may not be obtained.

Therefore, in cylinder type gas generator 1E in the present embodiment, firstly, diameter r of autoignition agent 71 is made smaller than diameter R of hollow portion 81 of filter 80, and secondly, positioning recess 72a is provided in division member 72 so that some of autoignition agent 71 is accommodated in positioning recess 72a. Then, when viewed in the axial direction of the circumferential wall portion of housing main body 10, autoignition agent 71 is positioned and arranged not to overlap with a portion of filter 80 except for hollow portion 81.

According to such a construction, the autoignition agent can be prevented from being caught at the end portion of filter 80 at the time of activation as described above, and desired gas output can be obtained in a stable manner.

Though an example in which division member 72 with the positioning function is applied to a cylinder type gas generator provided with heat insulating layer S1B in a cylindrical shape between accommodation chamber defining member 60 and housing main body 10 is illustrated in the present embodiment, heat insulating layer S1B does not necessarily have to be provided in the cylinder type gas generator only for obtaining the positioning function. Division member 72 may directly be fixed to housing main body 10 by press-fitting, or division member 72 may be fixed to accommodation chamber defining member 60 by press-fitting and then accommodation chamber defining member 60 may be fixed to the housing main body by press-fitting.

An example in which separation wall member 50 functioning as a spacer member holds one axial end portion of accommodation chamber defining member 60 arranged in combustion chamber S1 and increased diameter portion 61b1 is provided at the other axial end portion as abutting on housing main body 10 so that cylindrical portion 61b of accommodation chamber defining member 60 in the portion defining gas generating agent accommodation chamber S1A is arranged at a distance from housing main body 10 to thereby provide heat insulating layer S1B is illustrated and described in the first and second embodiments and the modification thereof of the present invention described above. An example in which separation wall member 50 functioning as a spacer member holds one axial end portion of accommodation chamber defining member 60 arranged in combustion chamber S1 and guide body 55 functioning as a spacer member holds the other axial end portion so that cylindrical portion 61b of accommodation chamber defining member 60 in the portion defining gas generating agent accommodation chamber S1A is arranged at a distance from housing main body 10 to thereby provide heat insulating layer S1B is illustrated and described in the third embodiment of the present invention described above. An example in which separation wall member 50 functioning as a spacer member holds one axial end portion of accommodation chamber defining member 60 arranged in combustion chamber S1 and the other axial end portion is loosely fitted so that cylindrical portion 61b of accommodation chamber defining member 60 in the portion defining gas generating agent accommodation chamber S1A is arranged at a distance from housing main body 10 to thereby provide heat insulating layer S1B is illustrated and described in the fourth and fifth embodiments of the present invention described above. A method of arranging cylindrical portion 61b at a distance from housing main body 10 is not limited to such an assembly structure, but other various methods are applicable.

Though an example in which only an ignition agent is loaded or an ignition agent and an enhancer agent are loaded in ignition portion 41 of igniter 40 is illustrated and described in the first to fifth embodiments and the modification thereof of the present invention described above, the enhancer agent does not necessarily have to be loaded in ignition portion 41 of igniter 40 if it is loaded, and the enhancer agent may be loaded at a position between ignition portion 41 of igniter 40 and gas generating agent 70, for example, by using a cup-shaped member or a container.

In addition, though description has been given in the first to fifth embodiments and the modification thereof of the present invention described above with reference to an example in which the present invention is applied to a cylinder type gas generator incorporated in a side air bag apparatus, applications of the present invention are not limited thereto and the present invention can be applied also to a cylinder type gas generator incorporated in a curtain air bag apparatus, a knee air bag apparatus, or a seat cushion air bag apparatus or what is called a T-shaped gas generator having an elongated outer geometry similarly to the cylinder type gas generator.

The embodiments and the modification thereof disclosed herein are thus illustrative and non-restrictive in every respect. The technical scope of the present invention is delimited by the terms of the claims, and includes any modifications within the scope and meaning equivalent to the terms of the claims.

REFERENCE SIGNS LIST 1A to 1E, 1A1 cylinder type gas generator; 10 housing main body; 11 gas discharge opening; 12 to 14, 12A, 12B swaging portion; 20 holder; 21 through portion; 22, 22A, 22B annular groove portion; 23 swaging portion; 24 depression portion; 25, 26 sealing material; 30 closing member; 31 annular groove portion; 40 igniter; 41 ignition portion; 42 terminal pin; 43 combustion control cover; 50 separation wall member; 51 separation wall portion; 51a score; 52 annular wall portion; 55 guide body; 56 bottom wall portion; 56a opening; 57 annular wall portion; 59 coil spring; 60 accommodation chamber defining member; 61 container body; 61a bottom portion; 61b cylindrical portion; 61b1 increased diameter portion; 61b2 opening end; 62 lid body; 62a lid portion; 62b fold-over portion; 62b1 first swaging portion; 62b2 second swaging portion; 70 gas generating agent; 71 autoignition agent; 72 division member; 72a positioning recess; 72b fixing cylinder portion; 72c through hole; 73 coil spring; 73a spring portion; 73b pressing portion; 75 cushion material; 80 filter; 81 hollow portion; 90 partition member; 91 base body; 91a base portion; 91a1 communication hole; 91b flange portion; 92 closing body; 92a closing portion; 92b cover portion; 93 sealing material; S1 combustion chamber; S1A gas generating agent accommodation chamber; S1B heat insulating layer; and S2 filter chamber

The invention claimed is:

1. A gas generator comprising:
an elongated cylindrical housing having axial one and the other end portions closed and having a circumferential wall portion;
a gas generating agent arranged in the housing;
an igniter assembled to the one end portion of the housing, the igniter serving to burn the gas generating agent;
an accommodation chamber defining member arranged in the housing, the accommodation chamber defining member defining a gas generating agent accommodation chamber where the gas generating agent is accommodated, the accommodation chamber defining member melting or bursting with heat or a pressure generated by activation of the igniter; and
an autoignition agent serving to burn the gas generating agent by self-igniting without depending on activation of the igniter,
the accommodation chamber defining member including at least a cylindrical portion which extends in a direction in parallel to an axial direction of the circumferential wall portion and accommodates the gas generating agent,
a heat insulating layer being provided in at least a part between the circumferential wall portion and the cylindrical portion,
the autoignition agent being arranged in a portion inside the housing in the axial direction of the circumferential wall portion where no heat insulating layer is provided, as being in contact with the circumferential wall portion with a member made of a metal being interposed,
a partition portion which partitions a space in the housing in the axial direction of the circumferential wall portion such that a combustion chamber where the accommodation chamber defining member is arranged is formed at a position on a side of the one end portion of the housing and a filter chamber where a filter is arranged is formed at a position on a side of the other end portion of the housing, wherein
the partition portion includes a cylindrical separation wall member and a bottom portion at an end of said cylindrical separation wall member, the separation wall member being inserted in the circumferential wall portion and formed from a member made of a metal, the heat insulating layer is located between the circumferential wall portion and the cylindrical portion, an axial end portion of the cylindrical portion being positioned on a side of the filter chamber in the separation wall member, and
the autoignition agent is arranged as being in contact with the circumferential wall portion with at least the separation wall member formed from the member made of the metal being interposed.

2. The gas generator according to claim 1, wherein
the accommodation chamber defining member includes a cylindrical container body including the cylindrical portion and a bottom portion which closes the axial end portion of the cylindrical portion on the side of the filter chamber, and
the container body is formed from a member made of a metal.

3. The gas generator according to claim 2, wherein
the separation wall member is arranged as abutting on the bottom portion and the autoignition agent is arranged in the container body as abutting on the bottom portion, so that the autoignition agent is arranged as being in contact with the circumferential wall portion with the bottom portion of the container body formed from the member made of the metal and the separation wall member formed from the member made of the metal being interposed.

4. The gas generator according to claim 3, the gas generator further comprising a division member formed from a member made of a metal and inserted in the cylindrical portion, the division member dividing a space in the container body into the gas generating agent accommodation chamber and a space where the autoignition agent is arranged, wherein
the autoignition agent is arranged as abutting on the division member so that the autoignition agent is arranged as being in contact with the circumferential wall portion with the division member formed from the member made of the metal and the cylindrical portion of the container body formed from the member made of the metal being interposed.

5. The gas generator according to claim 2, wherein
the autoignition agent is arranged outside the container body as abutting on the separation wall member and the bottom portion so that the autoignition agent is arranged as being in contact with the circumferential wall portion with the bottom portion and the cylindrical portion of the container body formed from the member made of the metal and the separation wall member formed from the member made of the metal being interposed.

6. The gas generator according to claim 2, wherein
the accommodation chamber defining member further includes a lid body formed from a member made of a metal in addition to the container body,
the lid body includes a lid portion which closes the axial end portion of the cylindrical portion on a side of the igniter, and
the gas generating agent accommodation chamber is hermetically sealed by the cylindrical portion, the bottom portion, and the lid portion.

7. The gas generator according to claim 6, wherein
the lid portion is formed of a part in a form of a flat plate which faces the igniter and is located in the container body as the lid portion is inserted into an opening end of the container body,
the lid body further includes a fold-over portion extending from a circumferential edge of the lid portion, at least a part of the fold-over portion being curved so as to cover an inner circumferential surface, an end surface, and an outer circumferential surface of the opening end of the container body, and a portion forming the fold-over portion is greater in thickness than a portion forming the cylindrical portion.

8. The gas generator according to claim 7, wherein the accommodation chamber defining member is biased toward the partition portion by arranging an elastic body as abutting on the fold-over portion and the one end portion of the housing.

9. The gas generator according to claim 8, wherein the elastic body is a coil spring.

10. The gas generator according to claim 7, wherein the heat insulating layer is provided between the circumferential wall portion and the cylindrical portion by loosely fitting an end portion of the accommodation chamber defining member on the side of the igniter into the housing.

11. The gas generator according to claim 1, wherein the accommodation chamber defining member includes an increased diameter portion which extends from the cylindrical portion in a portion where the gas generating agent is accommodated toward the one end portion of the housing, and the heat insulating layer is provided between the circumferential wall portion and the cylindrical portion by the increased diameter portion abutting on the circumferential wall portion.

12. The gas generator according to claim 1, the gas generator further comprising a guide member inserted in the circumferential wall portion at a position on the side of the one end portion of the housing, wherein the heat insulating layer is formed between the circumferential wall portion and the cylindrical portion by inserting an axial end portion of the cylindrical portion on the side of the igniter into the guide member.

13. A gas generator comprising:

an elongated cylindrical housing having axial one and the other end portions closed and having a circumferential wall portion;

an igniter assembled to the one end portion of the housing, the igniter serving to burn a gas generating agent;

a partition portion which partitions a space in the housing in an axial direction of the circumferential wall portion such that a combustion chamber where the gas generating agent is accommodated is formed at a position on a side of the one end portion of the housing and a filter chamber where a filter is arranged is formed at a position on a side of the other end portion of the housing;

an autoignition agent in a form of a pellet arranged in the housing, the autoignition agent serving to burn the gas generating agent by self-igniting without depending on activation of the igniter; and a division member which divides the combustion chamber in the axial direction of the circumferential wall portion into a space on the side of the one end portion of the housing and a space on a side of the other end portion of the housing, the gas generating agent being arranged in the space on the side of the one end portion of the housing in the combustion chamber divided by the division member, the autoignition agent being arranged in the space on the side of the other end portion of the housing in the combustion chamber divided by the division member, the filter including a hollow portion which extends from an axial end portion which faces the partition portion in the axial direction of the circumferential wall portion toward the other end portion of the housing, the autoignition agent being smaller in diameter than the hollow portion of the filter, the division member including a recess in a portion facing the partition portion in the axial direction of the circumferential wall portion, and at least some of the autoignition agent being accommodated in the recess provided in the division member so that, when viewed in the axial direction of the circumferential wall portion, the autoignition agent is positioned and arranged so as not to overlap with a portion of the filter except for the hollow portion.

14. The gas generator according to claim 13, the gas generator further comprising an accommodation chamber defining member arranged in the combustion chamber, the accommodation chamber defining member defining a space where the gas generating agent is accommodated and a space where the autoignition agent is accommodated, wherein the accommodation chamber defining member includes a cylindrical container body which includes a cylindrical portion extending in a direction in parallel to the axial direction of the circumferential wall portion and a bottom portion closing an axial end portion of the cylindrical portion on a side of the filter chamber, the division member is inserted in the cylindrical portion such that an outer edge of the division member abuts on an inner circumferential surface of the cylindrical portion, and the autoignition agent abuts on the bottom portion.

15. The gas generator according to claim 14, wherein the partition portion includes a cylindrical separation wall member and a bottom portion at an end of said cylindrical separation wall member, said cylindrical separation wall member being inserted in the circumferential wall portion, and a heat insulating layer is provided in at least a part between the circumferential wall portion and the cylindrical portion by inserting the axial end portion of the cylindrical portion on the side of the filter chamber into the separation wall member.

* * * * *